(12) United States Patent
Kowalski et al.

(10) Patent No.: US 9,412,084 B2
(45) Date of Patent: *Aug. 9, 2016

(54) SERVICE CONTEXT

(71) Applicant: BMC SOFTWARE, INC., Houston, TX (US)

(72) Inventors: Vincent J. Kowalski, Houston, TX (US); Simon J. King, Redwood City, CA (US); Tamar Shor, Tel Aviv (IL)

(73) Assignee: BMC SOFTWARE, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,291

(22) Filed: May 29, 2014

(65) Prior Publication Data

US 2014/0278824 A1  Sep. 18, 2014

Related U.S. Application Data

(63) Continuation of application No. 13/432,888, filed on Mar. 28, 2012, now Pat. No. 8,818,994, which is a continuation-in-part of application No. 13/169,846, filed on Jun. 27, 2011, now Pat. No. 8,745,040.

(51) Int. Cl.
  *G06F 17/30* (2006.01)
  *G06Q 10/06* (2012.01)
  *G06Q 10/00* (2012.01)

(52) U.S. Cl.
  CPC ...... *G06Q 10/0639* (2013.01); *G06F 17/30554* (2013.01); *G06Q 10/00* (2013.01)

(58) Field of Classification Search
  CPC ............. G06F 17/30554; G06Q 10/00; G06Q 10/0639
  USPC .......... 707/722, 769, 805; 705/7.38
  See application file for complete search history.

(56) References Cited

U.S. PATENT DOCUMENTS 8,291,061 B2 * 10/2012 Casati .................... G06Q 30/02
  709/203
8,423,536 B2 * 4/2013 Lieske, Jr. ........... G06F 17/3087
  707/722

(Continued)

FOREIGN PATENT DOCUMENTS

WO  2013148470 A1  10/2013

OTHER PUBLICATIONS

Advisory Action for U.S. Appl. No. 13/169,846, mailed Jul. 29, 2013, 4 pages.

(Continued)

*Primary Examiner* — Phong Nguyen
(74) *Attorney, Agent, or Firm* — Brake Hughes Bellerman LLP

(57) ABSTRACT

According to one general aspect, a method may include displaying a user interface associated with the application. The user interface may provide a selection of a business service that is implemented within an Information Technology (IT) environment by at least one server and at least one business application executing on the at least one server. The method may include requesting a service status for the business service based on the selection, and receiving a database result regarding the business service from a database server. The database result may include performance information associated with the business service. The method may include displaying the service status as a user interface element viewable within the user interface of the application. The service status may provide the performance information that has been received within the database result.

20 Claims, 21 Drawing Sheets

(56) References Cited

U.S. PATENT DOCUMENTS

| | | | |
|---|---|---|---|
| 8,457,682 B2 | 6/2013 | Raab | |
| 2002/0059264 A1* | 5/2002 | Fleming | G06Q 40/02 707/999.1 |
| 2002/0165844 A1* | 11/2002 | Lee | G06Q 40/04 706/61 |
| 2004/0204820 A1* | 10/2004 | Diaz | G08G 1/0962 701/522 |
| 2004/0260581 A1* | 12/2004 | Baranowski | G06Q 10/02 705/5 |
| 2005/0021838 A1* | 1/2005 | Levett | H04L 29/06 709/238 |
| 2005/0074112 A1* | 4/2005 | Timmins | H04M 3/4938 379/218.01 |
| 2005/0080661 A1* | 4/2005 | Casati | G06Q 30/02 709/224 |
| 2005/0234889 A1* | 10/2005 | Fox | G06F 17/30292 707/999.003 |
| 2005/0240617 A1* | 10/2005 | Lund | G06Q 10/107 707/999.102 |
| 2005/0288974 A1* | 12/2005 | Baranowski | G06Q 10/02 705/6 |
| 2006/0229807 A1* | 10/2006 | Sheha | G01C 21/3679 701/468 |
| 2007/0130137 A1 | 6/2007 | Oliver et al. | |
| 2007/0168915 A1* | 7/2007 | Fabbio | G06F 11/0709 717/101 |
| 2008/0033954 A1* | 2/2008 | Brooks | G06F 17/30613 707/999.009 |
| 2008/0162563 A1* | 7/2008 | Gross | G06F 17/30958 707/E17.011 |
| 2008/0262878 A1* | 10/2008 | Webby | G06Q 10/02 705/5 |
| 2009/0083367 A1* | 3/2009 | Li | G06Q 30/02 709/202 |
| 2009/0227280 A1* | 9/2009 | Raab | H04M 1/72536 455/550.1 |
| 2009/0299778 A1* | 12/2009 | Graham | G06Q 10/02 705/5 |
| 2009/0307018 A1* | 12/2009 | Chappell | G06F 17/30867 705/5 |
| 2009/0307268 A1* | 12/2009 | Chappell | G06Q 10/109 707/E17.005 |
| 2009/0307318 A1* | 12/2009 | Chappell | G06Q 10/109 709/206 |
| 2009/0327040 A1* | 12/2009 | McInerny | G06Q 30/0201 705/7.29 |
| 2010/0010978 A1* | 1/2010 | Carapella | G06F 17/30395 707/E17.014 |
| 2010/0017238 A1* | 1/2010 | Johnson | G06Q 10/025 705/6 |
| 2010/0017314 A1* | 1/2010 | Johnson | G06Q 10/025 705/30 |
| 2010/0036807 A1* | 2/2010 | Lieske, Jr. | G06F 17/30241 707/737 |
| 2010/0049556 A1* | 2/2010 | Liu | G06F 17/30867 705/5 |
| 2010/0223562 A1* | 9/2010 | Carapella | G06Q 10/02 715/760 |
| 2011/0071981 A1* | 3/2011 | Ghosh | G06F 11/2025 707/634 |
| 2011/0072217 A1* | 3/2011 | Hoang | G06F 12/084 711/130 |
| 2011/0107247 A1* | 5/2011 | Cormack | G06Q 10/10 715/771 |
| 2012/0042064 A1 | 2/2012 | Gagnon et al. | |
| 2012/0042164 A1 | 2/2012 | Gagnon et al. | |
| 2012/0158699 A1* | 6/2012 | Creel | G06F 17/30893 707/722 |
| 2012/0246324 A1* | 9/2012 | Kan | G06F 11/3433 709/226 |
| 2012/0323639 A1* | 12/2012 | Sabharwal | G06Q 10/067 705/7.38 |
| 2012/0330702 A1 | 12/2012 | Kowalski et al. | |
| 2012/0330929 A1 | 12/2012 | Kowalski et al. | |

OTHER PUBLICATIONS

Advisory Action for U.S. Appl. No. 13/432,888, mailed Jul. 29, 2013, 4 pages.
Dennis McLeod et al., "A federated architecture for database systems", AFIPS '80 Proceedings of the national computer conference, 1980, pp. 283-289, XP055072273.
Final Office Action for U.S. Appl. No. 13/169,846, mailed Mar. 20, 2013, 18 pages.
Final Office Action for U.S. Appl. No. 13/169,846, mailed on Oct. 25, 2012, 18 pages.
Final Office Action for U.S. Appl. No. 13/432,888, mailed Feb. 11, 2014.
Final Office Action for U.S. Appl. No. 13/432,888, mailed Mar. 22, 2013, 17 pages.
International Search Report and Written Opinion for International Application No. PCT/US2013/033355, mailed Jul. 29, 2013.
Non-Final Office Action for U.S. Appl. No. 13/169,846, mailed Aug. 27, 2013, 19 pages.
Non-Final Office Action for U.S. Appl. No. 13/432,888, mailed Aug. 27, 2013, 17 pages.
Non-Final Office Action for U.S. Appl. No. 13/432,888, mailed Oct. 26, 2012, 20 pages.
Notice of Allowance for U.S. Appl. No. 13/169,846, mailed Jan. 31, 2014, 17 pages.
Notice of Allowance for U.S. Appl. No. 13/432,888, mailed Apr. 28, 2014, 10 pages.

* cited by examiner

FIG. 2
200

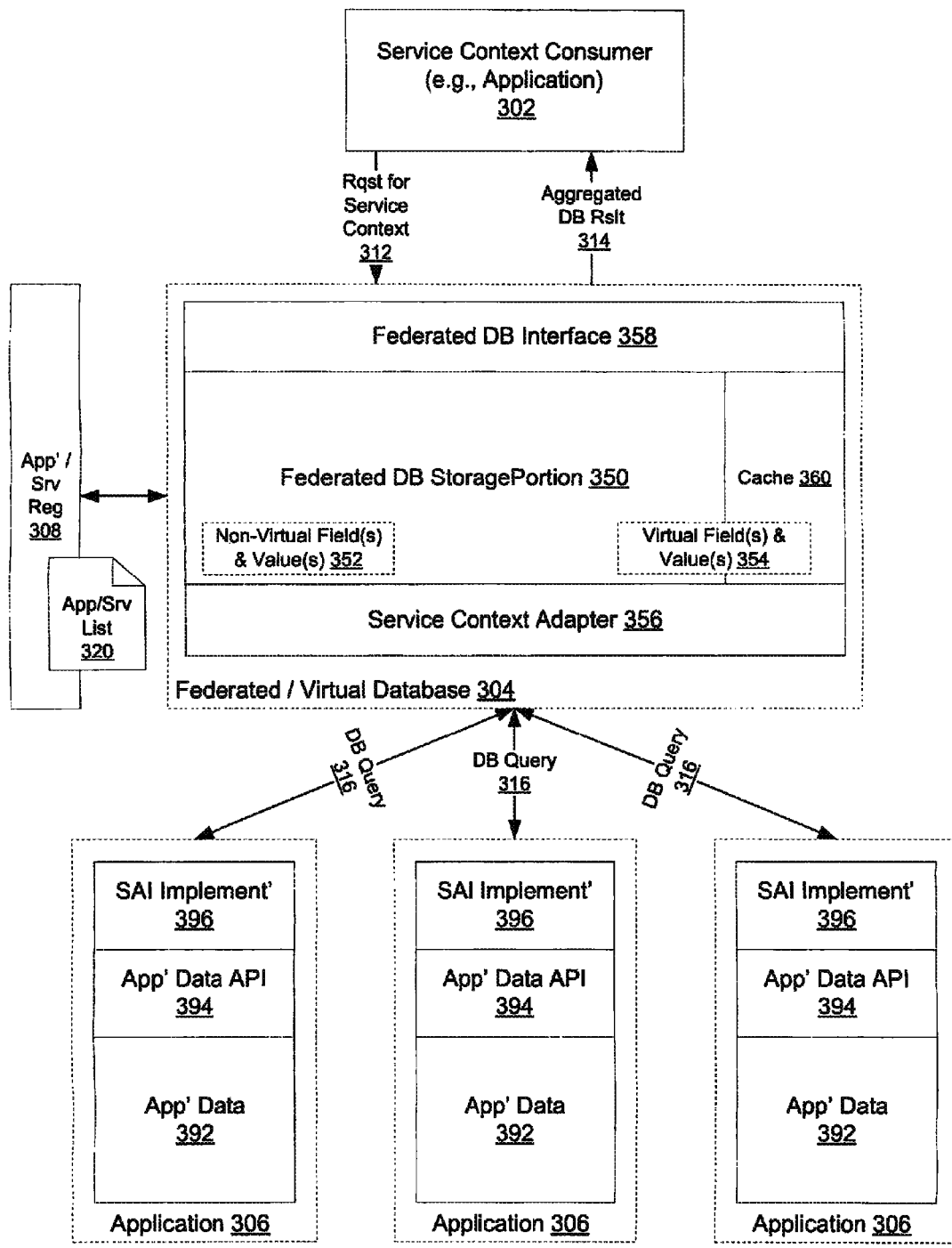

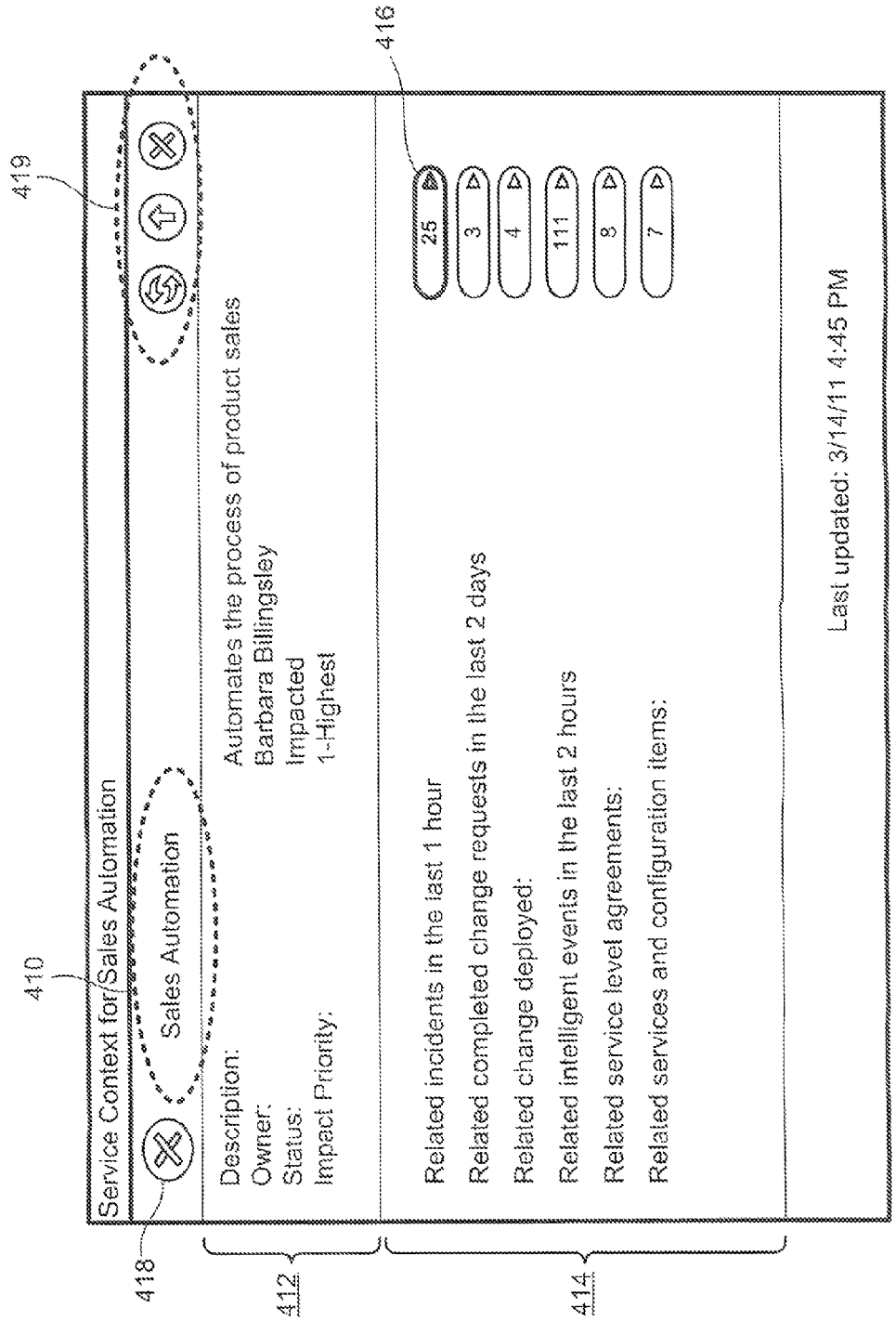

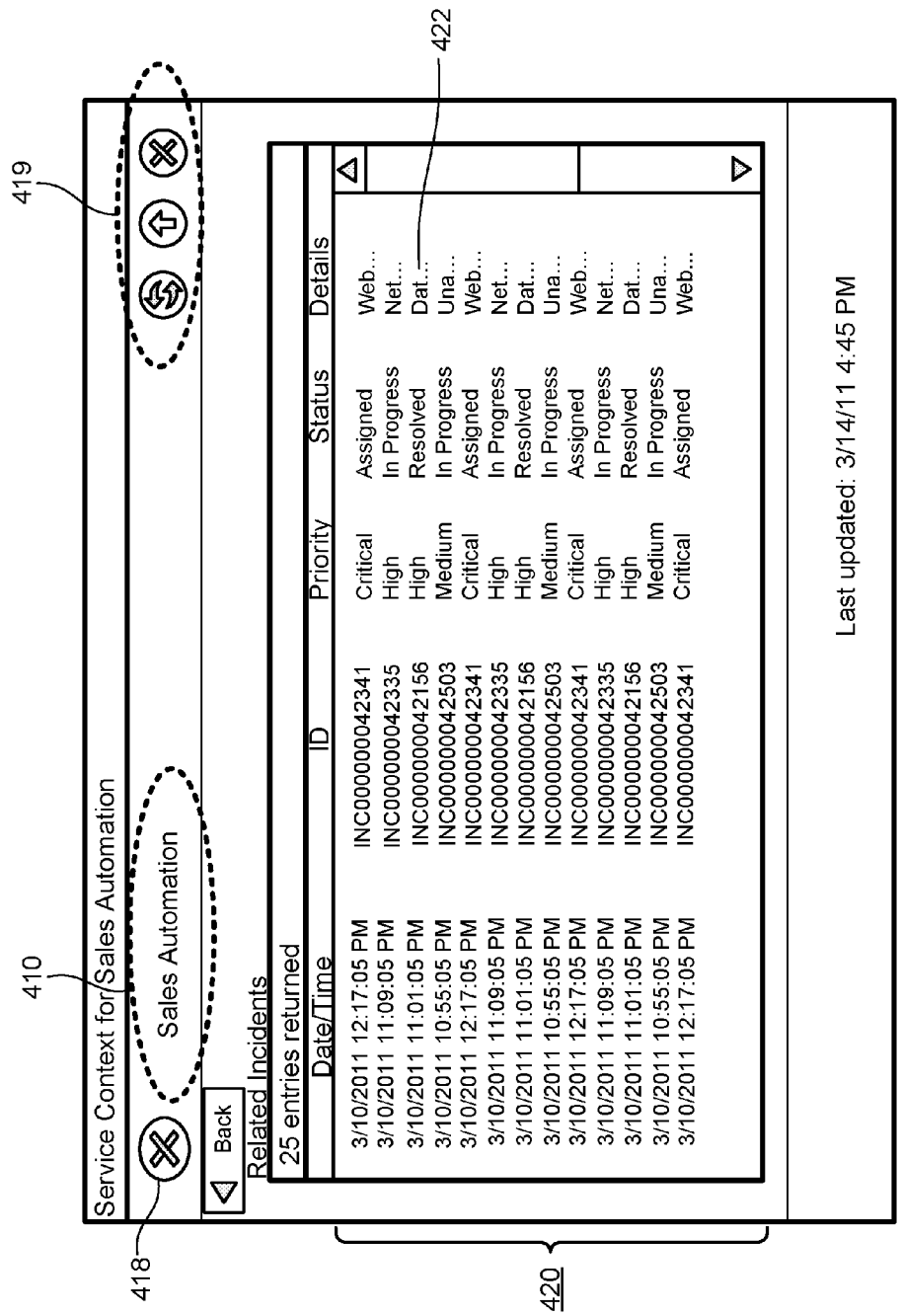

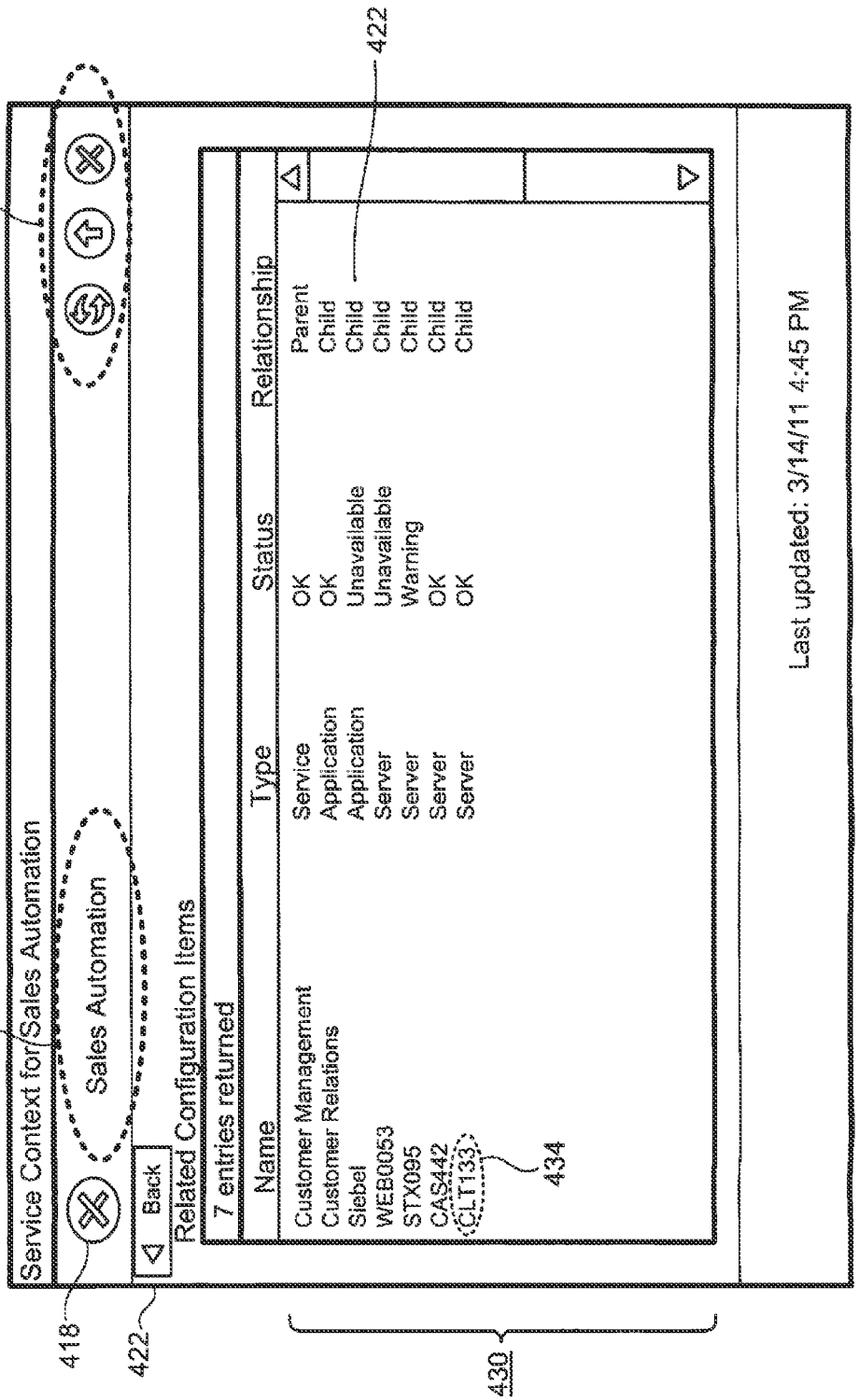

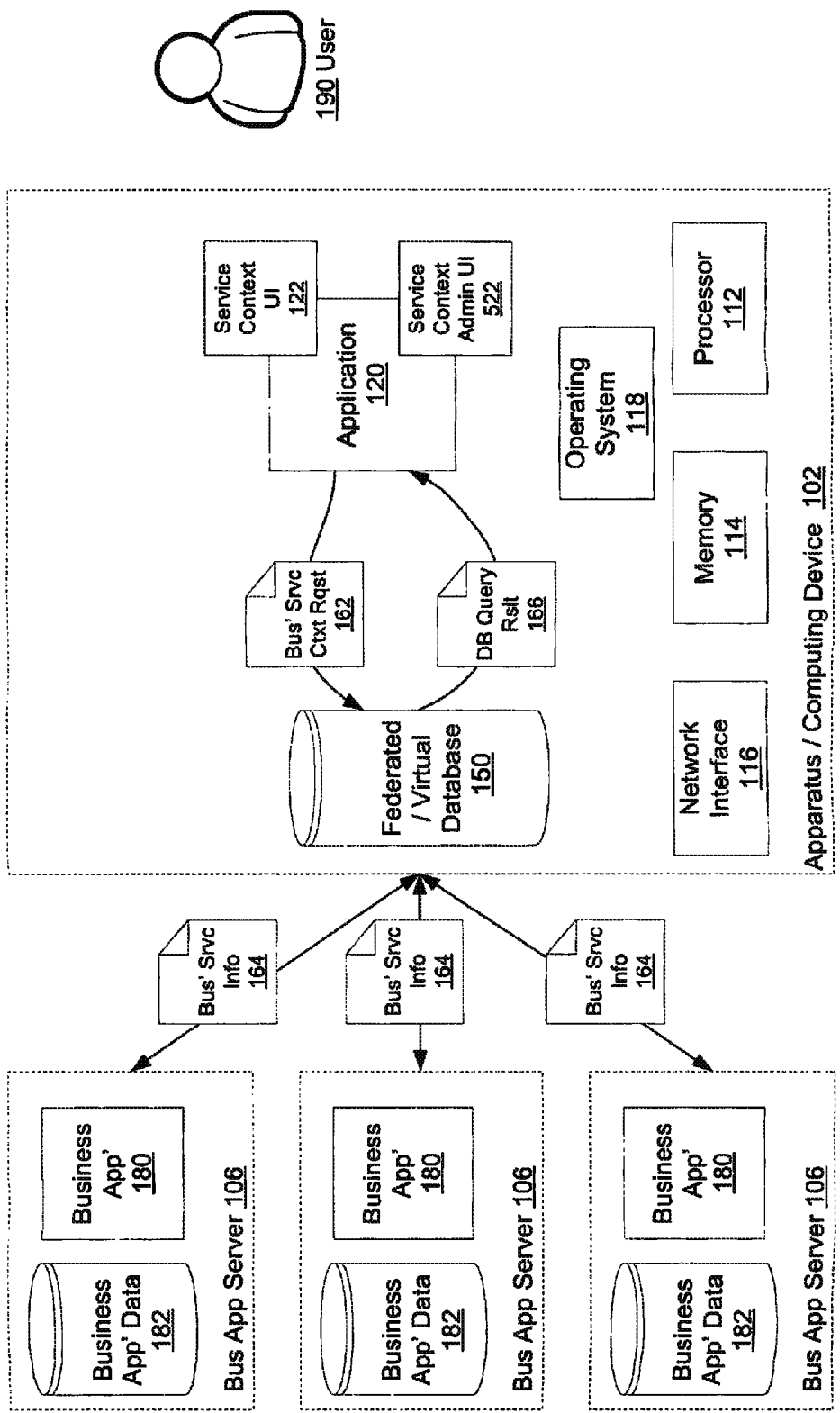

600

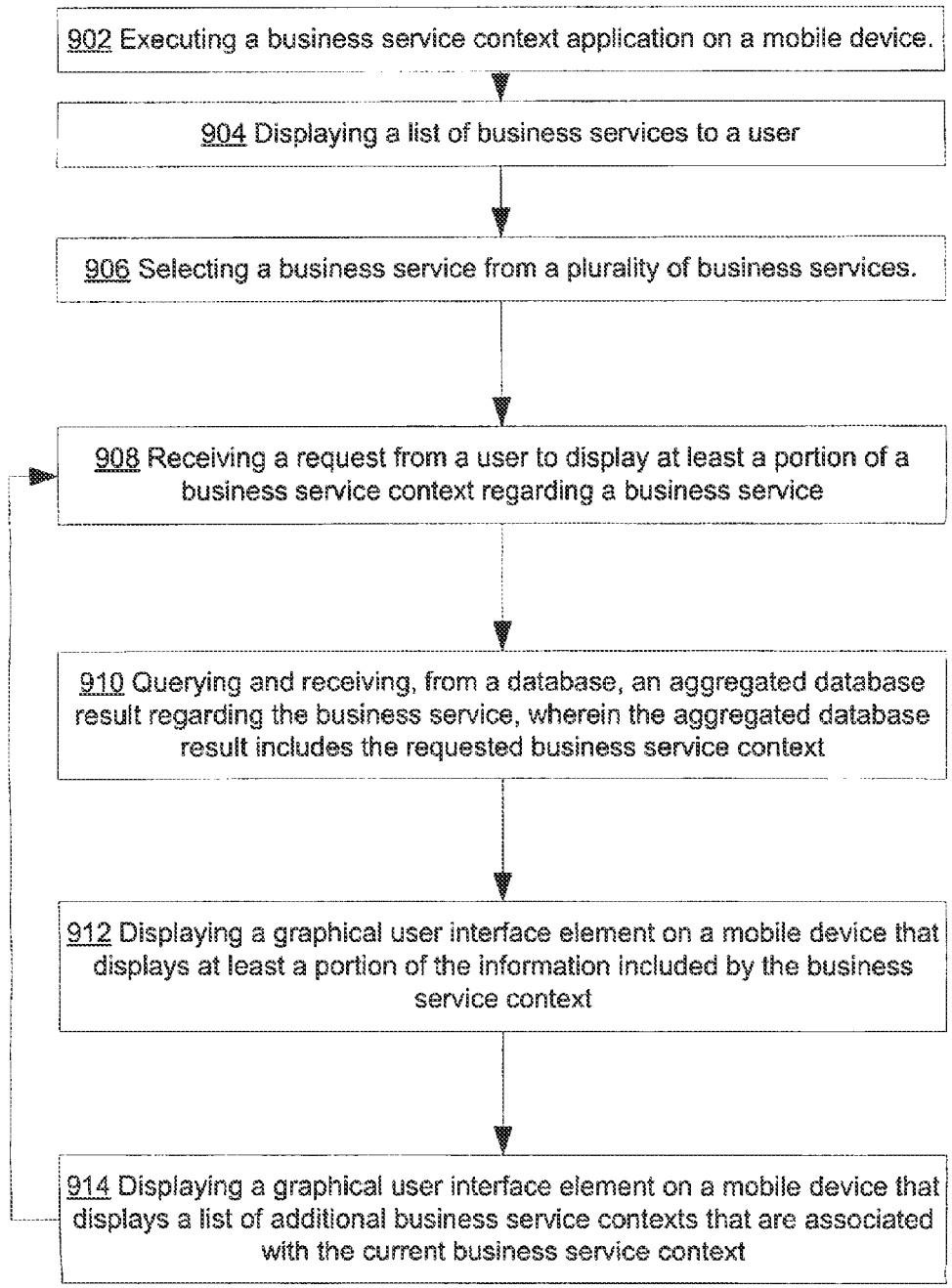

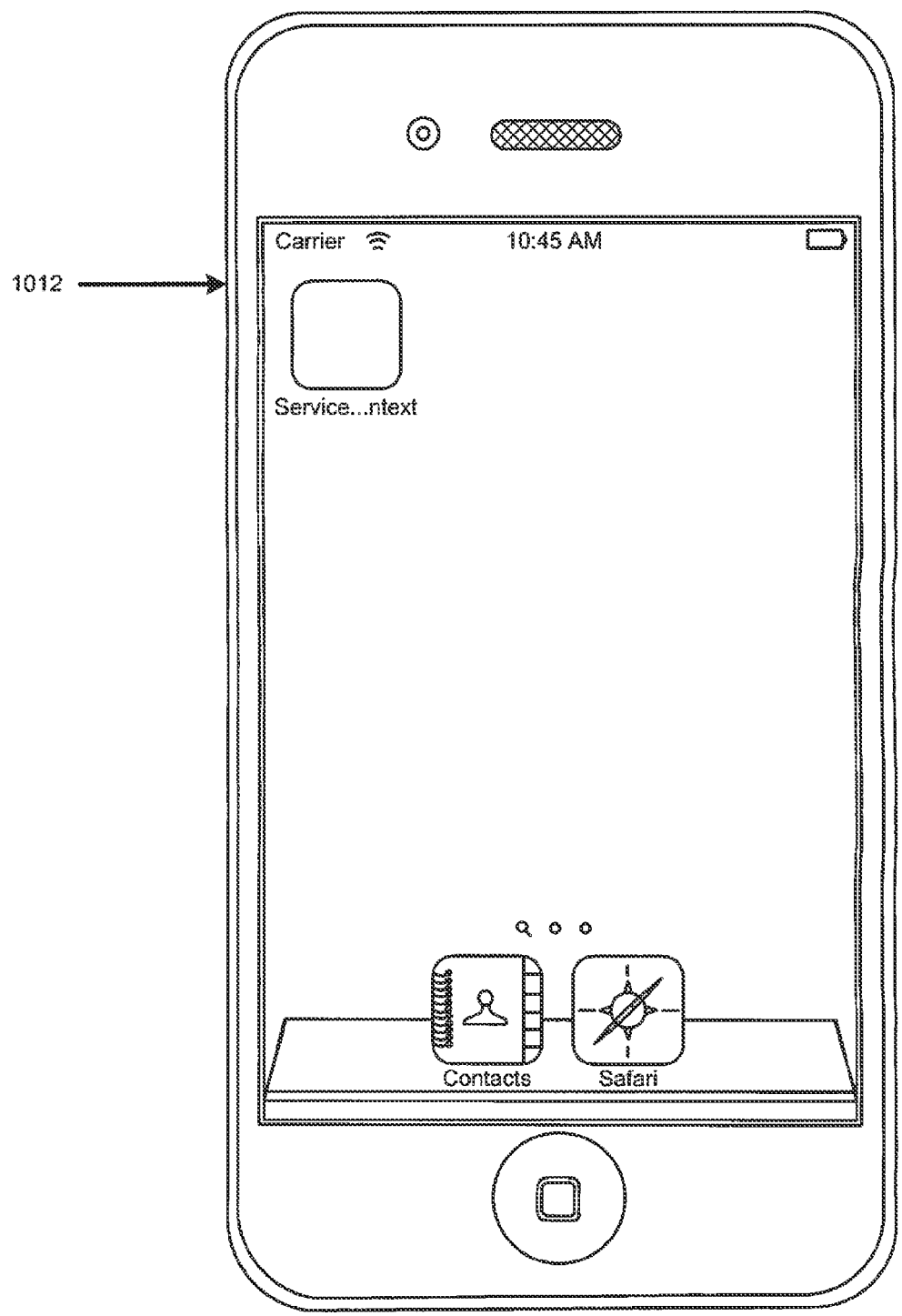

1092

1094

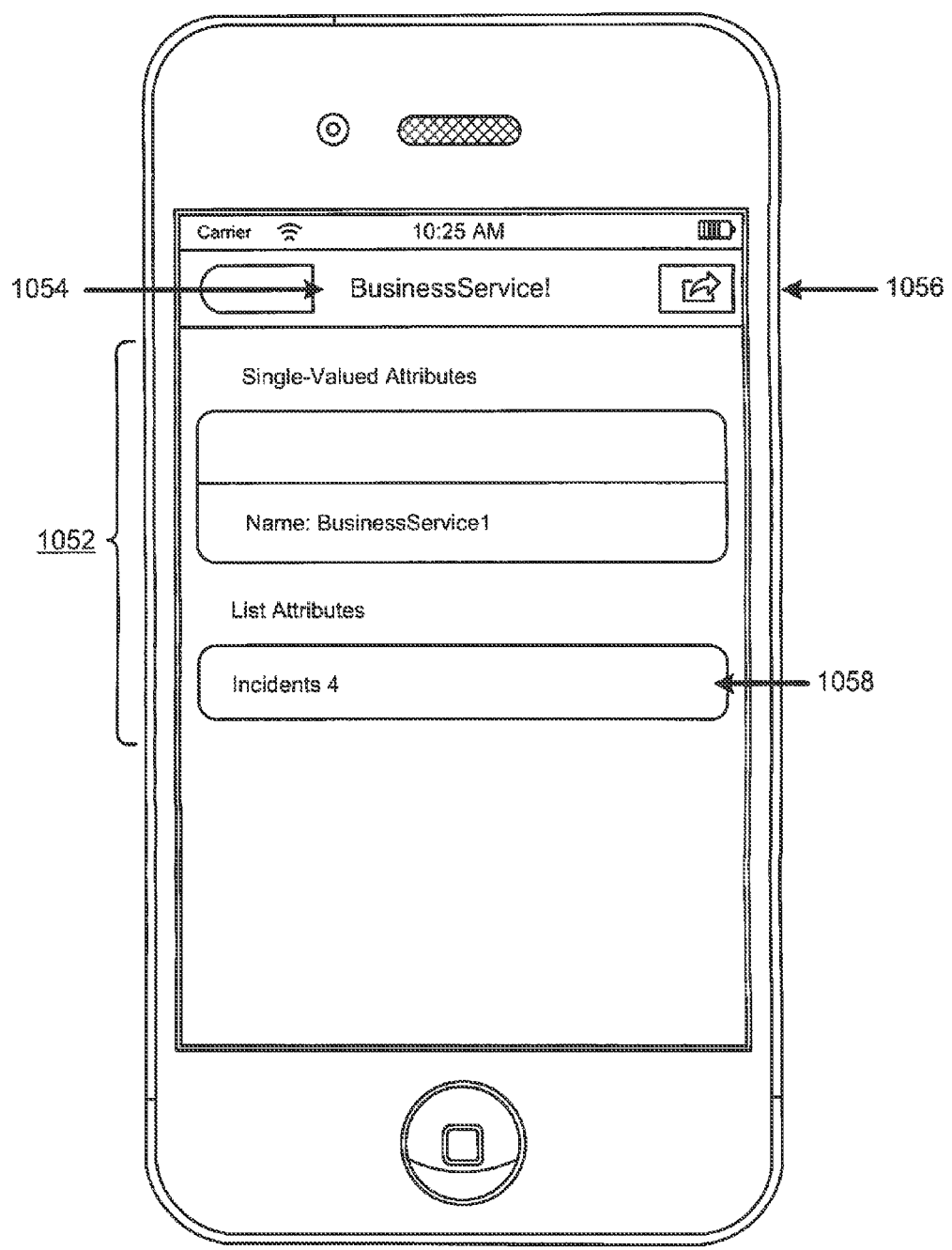

1096

1097

1098

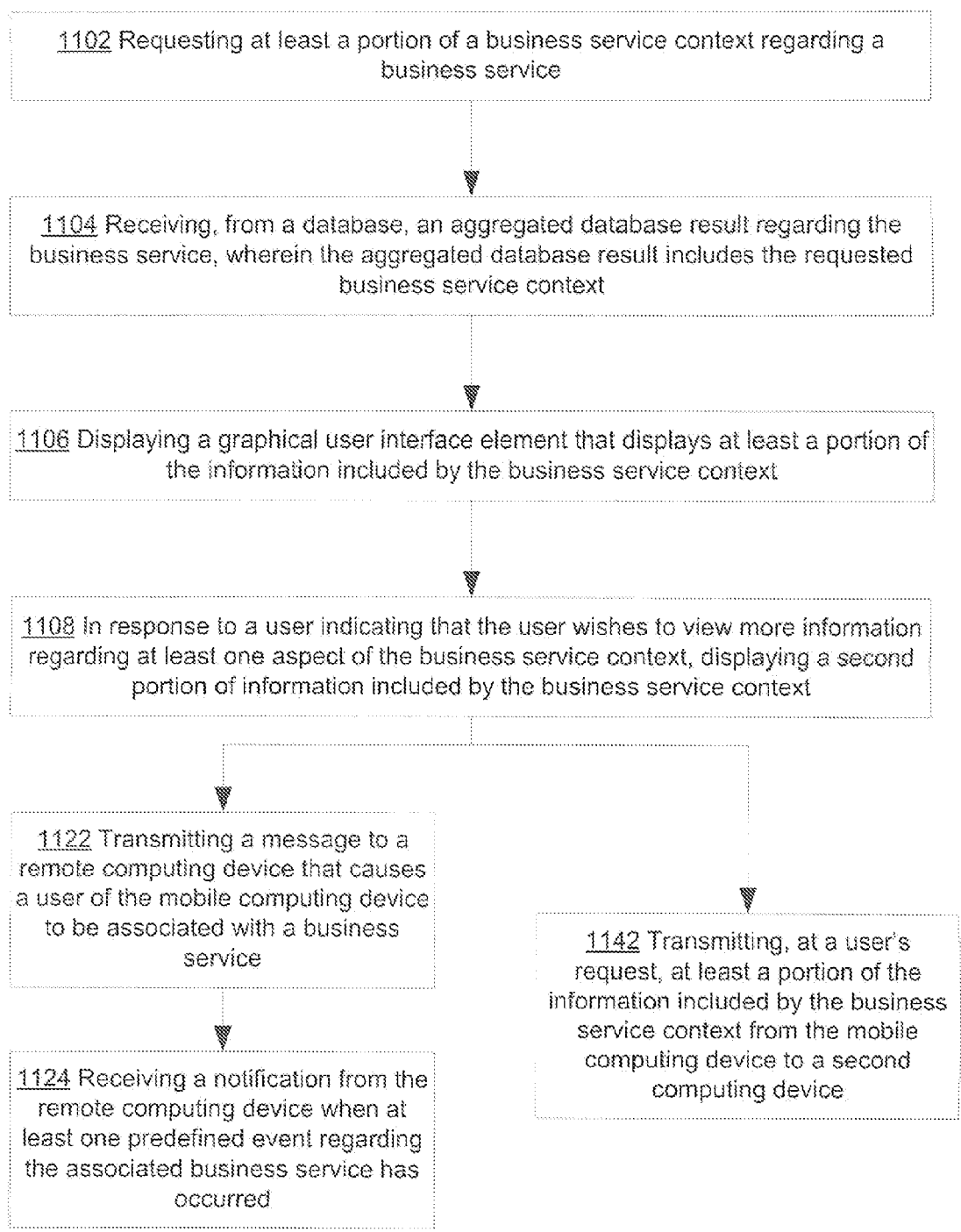

SERVICE CONTEXT

CROSS-REFERENCE TO RELATED APPLICATIONS

This application is a continuation of and claims priority to application Ser. No. 13/432,888, filed Mar. 28, 2012, entitled "Mobile Service Context", which is a continuation-in-part of and claims priority to application Ser. No. 13/169,846, filed on Jun. 27, 2011, entitled "Service Context". The subject matter of these earlier filed applications are hereby incorporated by reference in their entirety.

TECHNICAL FIELD

This description relates to business computing, specifically the collection and display of information related to a business service.

BACKGROUND

Business service management (BSM) is generally a methodology for monitoring and measuring information technology (IT) services from a business perspective. Often, BSM includes a set of management software tools, processes and methods to manage the IT of a business or businesses. BSM tools are generally designed to help IT organizations view and manage technology environments, in order to better support and maintain the main services they provide to the business.

Generally, businesses execute or run a number of applications or systems (e.g., computers, etc.). Often these applications may collect or have access to different types of data. For example, an email system may include an email server application which is executed by one or more physical computers or servers. In such an example, a Help-Desk application may collect or access data referring to various user's experiences and troubles with an email system. Conversely, the email server application itself my collect or access data regarding how the email system processes emails (e.g., user not found errors, failure to deliver errors, number of emails sent, etc.). A third business application may monitor the system resources (e.g., processor load, memory utilization, network bandwidth, etc.) used by the physical computer or computes executing the email server application.

Traditionally, these pieces of information may be dispersed across various IT or business applications. As such, a traditional BSM set of management tools may not be able to provide a user or BSM software with a full view of the status or health of the email system. Generally, an application, even a BSM application, may only access data that is accessible by that application. Therefore, the Help-Desk application, in a traditional environment, would not be able to access the data collected by the email server application (e.g., user not found errors, etc.) or the system resource monitoring application (e.g., network load, etc.). As a result, a user of the Help-Desk application would have a limited view or understanding of the state or status of the email system. Such issues may occur for other IT applications.

SUMMARY

According to one general aspect of the disclosed subject matter, a method may include requesting, from a database and by a program executing on a mobile computing device, at least a portion of a business service context regarding a business service. The method may also include receiving, from the database, an aggregated database result regarding the business service. The aggregated database result may include the requested business service context and wherein the business service context includes information from a plurality of applications. The method may also include displaying, via the mobile computing device, at least a portion of the information included by the business service context.

According to another general aspect of the disclosed subject matter, a mobile computing device may include a microprocessor, a network interface, and a monitor. The microprocessor may be configured to execute a software application. The network interface may be configured to request, at the instruction of the software application executing via the microprocessor, at least a portion of a business service context regarding a business service, and receive, from the database, an aggregated database result regarding the business service, wherein the aggregated database result includes the requested business service context and wherein the business service context includes information from a plurality of applications. The monitor may be configured to display at least a portion of the information included by the business service context.

According to another general aspect of the disclosed subject matter, a computer program product for the collection and display of information related to a business service may be tangibly and non-transitorily embodied on a computer-readable medium. The computer program may include executable code that, when executed, is configured to cause a mobile computing apparatus to: request, from a database, at least a portion of a business service context regarding a business service; receive, from the database, an aggregated database result regarding the business service, wherein the aggregated database result includes the requested business service context and wherein the business service context includes information from a plurality of applications; and display, via the mobile computing device, at least a portion of the information included by the business service context.

The details of one or more implementations are set forth in the accompanying drawings and the description below. Other features will be apparent from the description and drawings, and from the claims.

BRIEF DESCRIPTION OF THE DRAWINGS

FIG. 2 is a diagram of an example embodiment of a user interface in accordance with the disclosed subject matter.

FIG. 3 is a block diagram of an example embodiment of a system in accordance with the disclosed subject matter.

FIG. 4a is a diagram of an example embodiment of a user interface in accordance with the disclosed subject matter.

FIG. 4b is a diagram of an example embodiment of a user interface in accordance with the disclosed subject matter.

FIG. 4c is a diagram of an example embodiment of a user interface in accordance with the disclosed subject matter.

FIG. 5a is a block diagram of an example embodiment of a system in accordance with the disclosed subject matter.

FIG. 9 is a flow chart of an example embodiment of a technique in accordance with the disclosed subject matter.

FIG. 10a is a diagram of an example embodiment of a user interface in accordance with the disclosed subject matter.

FIG. 10e is a diagram of an example embodiment of a user interface in accordance with the disclosed subject matter.

FIG. 11 is a flow chart of an example embodiment of a technique in accordance with the disclosed subject matter.

Like reference symbols in the various drawings indicate like elements.

DETAILED DESCRIPTION

Figure 1:
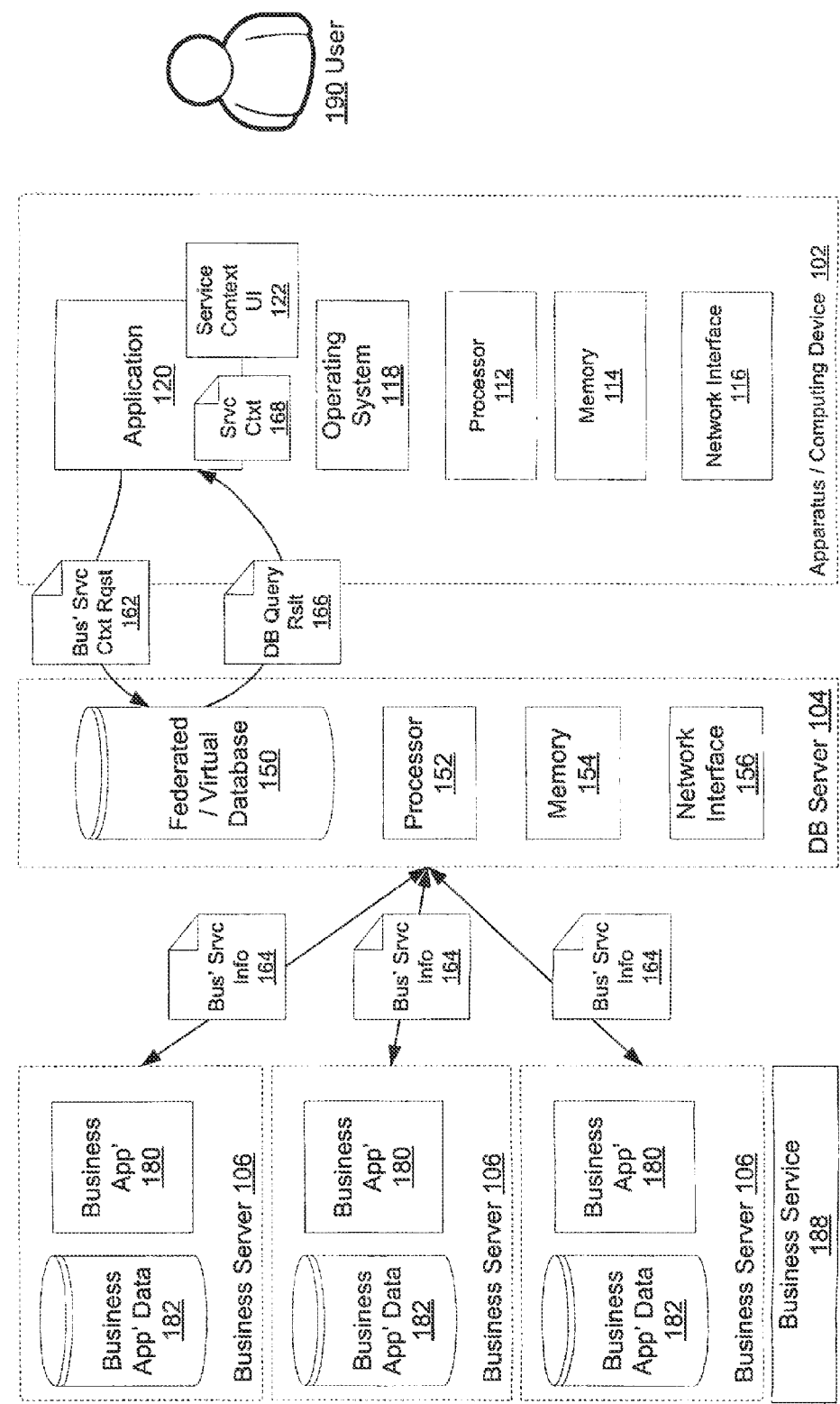
FIG. 1 is a block diagram of an example embodiment of a system in accordance with the disclosed subject matter.

FIG. 1 is a block diagram of an example embodiment of a system 100 in accordance with the disclosed subject matter. In one embodiment, the system 100 may include an apparatus 102 that is used or operated by a user 190, a database (DB) server or system 104, and one or more business application servers 106. In various embodiments, the apparatus 102 may include a traditional computer (e.g., a desktop, laptop, netbook, etc.) or a non-traditional computing device (e.g., smartphone, tablet, thin client, computer terminal, etc.). It is understood that, while three business application servers 106 are illustrated, the disclosed subject matter is not limited to any number of such devices. Further, it is understood that the devices 102, 104, and 106 may include instantiations of such devices included in a virtual or modular environment (e.g., a blade server system, virtual machines, etc.).

In this context, the term "business service" refers to a software application or a computing device operated within an Information Technology (IT) environment. In one embodiment, the a business service may include software applications, such as, for example, an email server, a file server, a Help-Desk application, a customer relationship management (CRM) application, an automation application, etc. In another embodiment, a business service may include computing devices, such as for example, a business application server 106, a blade server executing a plurality of business applications, a server pool executing one or more instances of a business application (e.g., a web server, etc.), computing devices issued to employees or users 190, etc. It is understood that the above are merely a few illustrative examples to which the disclosed subject matter is not limited.

In this context, the term "business application" refers to a business service that is a software application or, more colloquially, an application (e.g., a Help-Desk application, a sales automation application, etc.). In this context, the term "business server" or "business application server" refers to a computing device that executes a business application (e.g., a server pool, a blade server, etc.).

In the illustrated embodiment, a user 190 may operate, use or control an apparatus or computing device 102. In various embodiments, the computing device 102 may include a processor 112 configured to execute a stream or machine executable instructions (e.g., operating system 118, application 120, etc.).

The computing device 102 may include a memory 114 configured to store data and/or instructions. In various embodiments, the memory 114 may include volatile memory, non-volatile memory, or a combination thereof. The memory 114 or portions thereof may be configured to store data in a temporary fashion (e.g., Random Access Memory (RAM), etc.) as part of the execution of instructions by the processor 112. The memory 114 or portions thereof may be configured to store data in a semi-permanent or long-term fashion (e.g., a hard drive, solid-state memory, flash memory, optical storage, etc.).

In various embodiments, the computing device 102 may include one or more network interfaces 116 configured to communicate with other devices (e.g., server 104, etc.) via a communications network. In various embodiments, this communications network may employ wired (e.g., Ethernet, Fibre Channel, etc.) or wireless (e.g., Wi-Fi, cellular, etc.) protocols or standards or a combination thereof.

In one embodiment, the computing device 102 may include an operating system (OS) 118 that may be executed by the processor 112. In such an embodiment, the OS 118 may be configured to act as an intermediary between application programs (e.g., application 120, etc.) and the computer hardware (processor 112, network interface 116, etc.). However, the application may be executed directly by the hardware and may frequently call the OS 118 or be interrupted by it.

In various embodiments, the computing device 102 may include or execute an application 120. In various embodiments, the application 120 may include a BMC software application and may be executed by the processor 112 in conjunction with the OS 118. In one embodiment, the computing device 102 may also include other applications (not shown).

In one embodiment, the user 190 may desire to view or access information regarding a particular business service (e.g., one of the business application server 106, one of the business applications 180, etc.). In such an embodiment, the user 190 may request the display of a business service context user interface element 122. In this context, the terms "business service context" and "service context" are synonymous.

Figure 2:
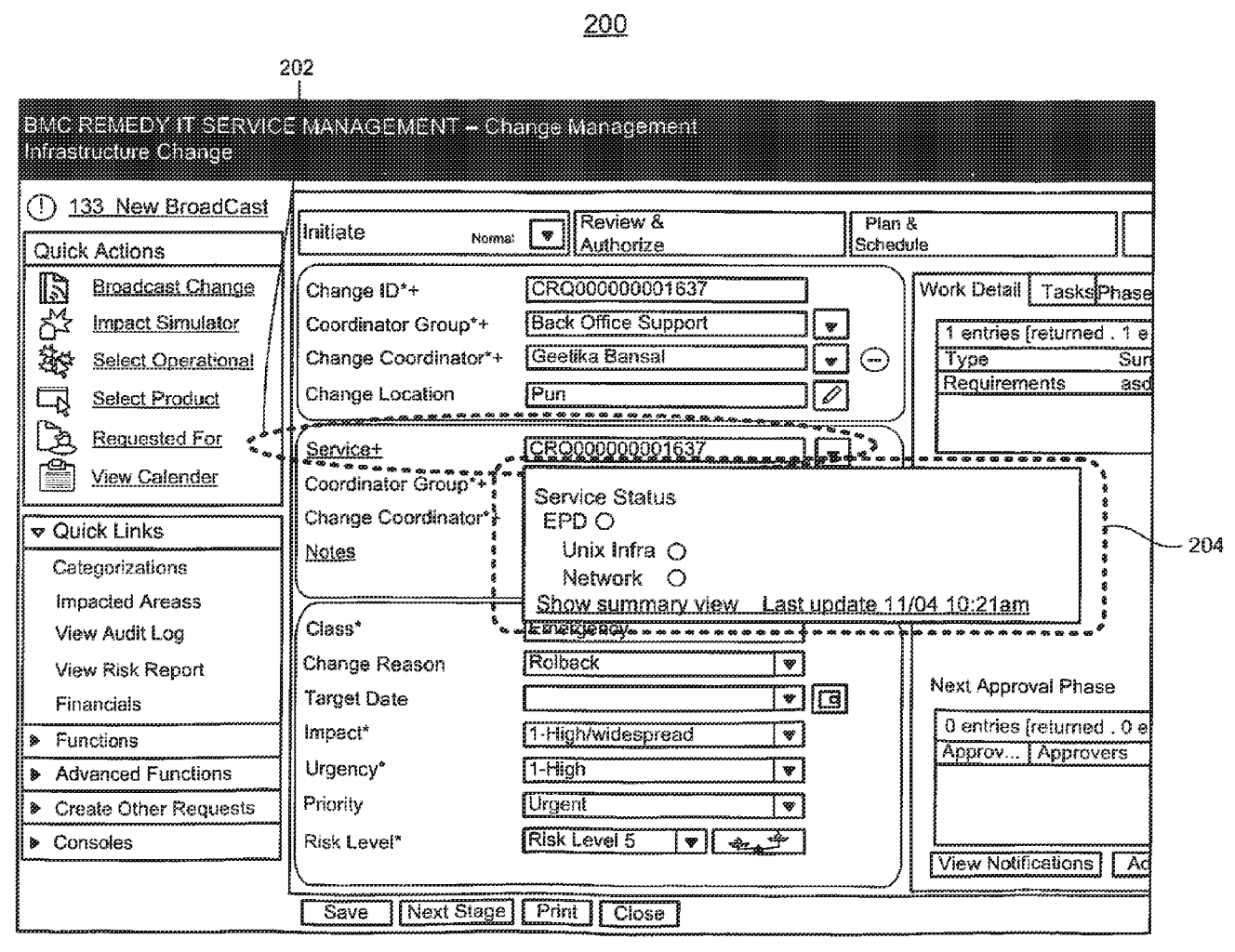

FIG. 2 is a diagram of an example embodiment of a user interface (UI) 200 in accordance with the disclosed subject matter. In the illustrated embodiment, the UI 200 may be the main or a portion of the UI for an application executing on a computing device (e.g., application 120 of FIG. 1). In the illustrated embodiment, the application may be an IT Service Management (ITSM) application. However, in various embodiments, the service context may be launched or displayed within any tool or application (e.g., ITSM, BMC ProactiveNet Performance Management (BPPM), etc.). It is understood that the above are merely a few illustrative examples to which the disclosed subject matter is not limited.

In this example embodiment, the user may desire to see or access information regarding a particular business service. In the illustrated embodiment, the user has selected to display a service context for business service 202.

In one embodiment, the user may right-click on the UI element 202 associated with the desired business service (e.g., an Electronic Product Distribution (EPD) business service, etc.). This may bring up a context menu, from which the user may select to display a service context associated with the selected business service. In another embodiment, an icon or button may bring up the service context. In yet another embodiment, other UI means or forms of interaction (e.g., gestures, hyperlinks, etc.) may be employed to indicate a user's request to display the service context of the selected business service. It is understood that the above are merely a few illustrative examples to which the disclosed subject matter is not limited.

In various embodiments, once the service context has been obtained, as described in more detail below, the application may display the service context UI element 204 to display the service context or a portion thereof.

In various embodiments, the business service context may include a means by which applications can reach into data they do not normally provide themselves or have access to in order to give users a thumbnail sketch or condensed version or view of what a given business service is and how it is performing. In some embodiments, the business service context and the UI element 204 displaying the business service context may be likened to a packing label (as used on shipping packages, e.g., FedEx, etc.) for business services. However, it is understood that the disclosed subject matter is not limited to this analogy, and that the analogy is merely for illustrative purposes.

In various embodiments, the application may be able to make available a visual UI component 204 that a user may bring up or request in the context of some application they are running (e.g., IT Service Management, etc.) for a given business service (e.g., business service 202, EPD, etc.) that is viewable in the UI 200 of the launching application.

In some embodiments, this UI element 204 may be referred to as the Service Context Summary View and is discussed in more detail below in regards to FIG. 4a. In such an embodiment, further UI elements may also be displayed or, in one embodiment, replace the UI element 204. These subsequent UI elements may be referred to as sub-views and may include, in various embodiments, a list view configured to display additional inform regarding the service in a less condensed or alternate format. In various embodiments, various UI elements or views may focus on various aspects of the selected business service. It is understood that the above are merely a few illustrative examples to which the disclosed subject matter is not limited.

In another embodiment, data from Service Context may be integrated in the User Interface 200 of the application the consumes or makes use of the Service Context (as opposed to being displayed in a separate UI element, e.g., UI element 204, etc.). In such an embodiment, the set of data available to such applications may be enriched and may, in one embodiment, make the user experience more productive. In such an embodiment, the integration of Service Context Data into the UI 200 of the launching application may be referred to as the Native View of Service Context. In such an embodiment, various applications may access and use data from the Service Context without ever needing to display the visual UI element 204. It is understood that the above are merely a few illustrative examples to which the disclosed subject matter is not limited.

A user may desire the display of a business service context for a variety of reasons. Below, a few example usages cases of the service context are described. It is understood that the below are merely a few illustrative examples to which the disclosed subject matter is not limited.

In a first example, in applications that include ticketing systems, help desks or service desks one of the most inefficient processes is getting an incident or support ticket assigned to the correct personnel. Once an incident is entered into the system, it may be handed off several times before the correct assignment is made. A service context and the display of the service context (at least in part) may aid in the identification of the correct assignee of an incident by providing richer, more relevant data that is related to a given business service. In a very short period of time someone looking at a Service (via the business service context UI element) can tell what incidents are associated with it. Subsequent drill downs or other UI elements or views may show if such a business service has, for example, some infrastructure component that has failed. Armed with such information a help desk employee may quickly assign to the incident to the appropriate system administrator.

In a second example, the flow of information across management disciplines is often not as fluid as it often should be. Problems that are encountered in one discipline may simply stay with the personnel associated with that business group or silo or if the problem does get communicated outward, the communication is often done in a less than optimal fashion. With a service context the information collected within a given silo or business group is the same as that in other disciplines, silos, or business groups. The service context may be discipline agnostic. As such the data values and their respective visual representations in the summary view or other UI element may be shared across disciplines or business groups with little risk that they will be misunderstood or misinterpreted.

In a third example, with a service context, a user may be given enough information regarding what could be wrong with a given business service. However, if the user needs or desires better, more detailed information they can obtain it by launching another business application. In such an embodiment, the service context and the UI element displaying it may provide the user with a starting point to help them get started on solving a problem regarding the business service without the user having to start or execute each of the various (and often more intensive) business applications.

In various embodiments, the service context and/or the UI element 204 that displays the service context may be consistent in one or more ways. For example, the look and feel of the UI element 204 may be consistent across applications. A user may display the service context in help-desk application or in an IT service management application and the UI element 204 may be substantially identical. In various embodiments, this may be beneficial as users in various business groups or of various business applications may be conditioned to know what to expect from the business context and how to process the information contained within.

In some embodiments, the service context may be consistent in terms of the data, information, or attributes displayed. For example, regardless of the application displaying or launching the service context UI element the UI element may include the same fields (e.g., business service description, business service owner, business service state, etc.) and the same values for those fields. Again, such consistency may aid user efficiency.

In yet another embodiment, the service context and/or the UI element 204 that displays the service context may be configured to display the information regarding the business service in a simple and speedy manner. Returning to the analogy of the service context as a packing label, the service context may include or display only information that is deemed (e.g., by a system administrator, etc.) critical and no more (unless a subsequent view or UI element is displayed), such that the information contained therein is easily understandable by a user.

Returning to FIG. 1, while the process of creating and displaying the service context is shown for a single application (e.g., application 120, etc.), it is understood that the service context of a given business service may be displayed within a number of supporting applications. For example, a second user and a second computing device executing a second application (not shown) may also request a service context for the same business service as the user 190. In such an embodiment, the second user and the user 190 may see an identical or substantially equivalent service context or the UI element 122 displaying the service context. In such an embodiment, a user at a help-desk application and a user at a device provisioning application may see substantially the same service context with a consistent look and feel, and data values (e.g., business service status, etc.) regardless of their host application (e.g., application 120, etc.).

In the illustrated embodiment, the user 190 may request to display the service context 168 of a given business service 188. In various embodiments, the business service 188 may include one of the business servers 106, one of the business applications 180, or another business service. It is understood that the above are merely a few illustrative examples to which the disclosed subject matter is not limited.

In such an embodiment, the application 120 may transmit or send a business service context request 162 to a federated database 150. In various embodiments, the business service context request 162 may include an attribute or field indicating which business service the service context request pertains. In a preferred embodiment, the federated DB 150 may include a configuration management DB (CMDB). However, in a less preferred embodiment, general storage components (e.g., a relational database, etc.) may be included in the federated DB 150. It is understood that the above is merely one illustrative example to which the disclosed subject matter is not limited.

In the illustrated embodiment, the federated DB 150 may be executed or included by the DB server 104. In various embodiments, the DB server 104 may include a processor 152, a memory 154, and at least one network interface 156, as described above. As described above, in various embodiments, the memory 154 may include volatile storage (e.g., random access memory etc.), non-volatile storage (e.g., a hard drive, a solid-state drive, etc.), or a combination thereof. In such an embodiment, the federated DB 150 may be stored, at least in part, by a portion of the memory 154.

In various embodiments, the federated DB 150 may include a virtual or at least partially virtual DB. In such an embodiment, the federated DB 150 may not include the service context 168 or the information included in the service context 168. However, the federated DB 150 may provide a single point of query for the service context information or virtualize a database that appears (to the application 120) to include the information included in the service context 168.

In such an embodiment, the federated DB 150 may retrieve information from a plurality of other business applications 180. In various embodiments, once the federated DB 150 has received a request for the information regarding the business service 188, the federated DB 50 may then in turn query one or more business applications 180 regarding the business service 188.

In various embodiments, the queried business applications 180 may retrieve information (if such exists) regarding the business service 188 from their respective business application data repositories 182. This information 164 may then be transmitted to the federated DB 150.

In such an embodiment, the federated DB 150 may then generated an aggregated database result 166 based, at least in part, upon the various pieces of information 164 regarding the business service 188 retrieved from the plurality of business applications 180. In one embodiment, the federated DB 150 may aggregate the information 164 in such a way that the aggregated DB result 166 appears as if the federated DB 150 was not virtual but actually included the desired information in a physical storage location. Further, in such an embodiment, the aggregated database result 166 may provide the application 120 with the information for the service context 168 or the service context 168 itself in a single database transaction. In such an embodiment, the application 120 may not have to ask repeatedly for data or be constantly updated as new information 164 arrives from the various business applications 180.

In one embodiment, the application 120 may receive the aggregated database query result 166. As described above, in various embodiments, this aggregated database query result 166 may include the service context 168. In various embodiments, the application 120 may the filter or condense the information included by the service context 168 into a predetermined format (e.g., a series of predefined fields to be displayed, etc.). This portion of the service context 168 may then be displayed to the user 190 via the service context UI element 122.

In such an embodiment, if the user 190 wishes to "drill down" or display other portions of the service context 168, new UI elements or views may be generated and displayed based upon predefined rules detailing the contents of such UI elements. Various embodiments of such views are described in reference to FIGS. 4a, 4b, and 4c, below. It is understood that the above are merely a few illustrative examples to which the disclosed subject matter is not limited.

FIG. 3 is a block diagram of an example embodiment of a system 300 in accordance with the disclosed subject matter. In various embodiments, the system 300 may be a more detailed embodiment of portions of the system 100 of FIG. 1. In the illustrated embodiment, the system 300 may include a service context consumer 302 that may be an application as described in reference to FIG. 1. The system 300 may also include, in one embodiment, a federated of at least partially virtual database (DB) 304. The system 300 may also include one or more provider applications 306 that each provide information or data regarding a particular business service which is the focus of the current business service context.

In various embodiments, the service context consumer or consumer application 302 may request 312 a service context for a given business service. This request 312 may be made to the federated database 304. The service context consumer 302 may expect to receive, in return, an aggregated database query result 314, which may include the requested service context. In such an embodiment, the service context consumer 302 may request 312 and receive 314 the service context (or information from which the service context may be derived) in a single atomic database transaction, as described above.

In the illustrated embodiment, the federated or partially virtual database 304 may include a federated DB 304 may include a federated DB interface 358 that is configured to receive database requests (e.g., request 312, etc.) and provide database query results (e.g., query result 314, etc.) as if the DB 304 was a non-virtualized database. In various embodiments, the federated DB interface 358 may be referred to as a Service Context Abstraction Layer (SCAL) that presents a virtual view of all the attributes gathered from the various Application Data APIs 394 by this architecture. By presenting the attributes in this way a consumer application 302 (e.g., the Service Context View or Native Views) may get all the attributes needed or the service context in one retrieval operation. In addition, the federated DB interface 358 may be alternatively exposed as a Web Service for those consumer applications 302 that prefer this protocol.

The federated DB 304 may include Federated DB storage portion 350. configured to "store" various database entries or information regarding one or more business services. As described above, in various embodiments, this storage may occur virtually, at least in part, in that the federated DB 304 not actually store, at least in a long term sense, the information included in the storage portion 350, but may instead access the data dynamically from the one or more provider applications 306.

However, in some embodiments, the federated DB 304 may include one or more non-virtual fields or database entries and their respective values 352. These non-virtual fields 352 may include fundamental or default values for the various business services referenced by the federated DB 304. Such fields may include: the business service's name, the business service's description, the owner of the business service, etc. It is understood that the above are merely a few illustrative examples to which the disclosed subject matter is not limited.

In addition, the federated DB 304 may include one or more virtual fields or database entries and their respective values 354. These virtual fields 354 may include any database fields and values that are retrieved from a provider application 306 and only nominally stored in the federated DB 304. Example virtual fields may include: business service status, number of incidents or other performance metrics associated with the business service, business service location, etc. It is understood that the above are merely a few illustrative examples to which the disclosed subject matter is not limited.

In such an embodiment, the federated DB 304 may be referred to as merely partially virtual as the federated DB 350 may include both non-virtual fields 352 and virtual fields 354 that are aggregated to provide the illusion that the federated DB 304 includes a larger more informative DB than actually exists. The non-virtual fields 352 and virtual fields 354 may be aggregated to provide the illusion that the federated DB 304 is a single monolithic database. However, in another embodiment, the federated DB 304 may be fully virtual and may not include the non-virtualized fields 352. In yet another embodiment, the federated DB 304 may be non-virtual and the information illustrated as being stored in the virtual fields 354 may be actually stored in non-virtual fields 352 of a non-virtualized federated DB. It is understood that the above are merely a few illustrative examples to which the disclosed subject matter is not limited.

In various embodiments, the federated DB 304 may include a cache 360 to temporarily store the virtual fields 354 retrieved from the provider applications 306. By temporarily storing results of retrievals from the provider applications 306, the system 300 may avoid having to re-retrieve such data each time it is requested by the consumer application 302.

In one embodiment, the federated DB 304 may include a service context adapter 356. In such an embodiment, the service context adapter 356 may be configured to access data that is delivered from the provider applications 306. A described below, this information may be provided by the provider application 306 via a standardized format regardless of the specific provider application 306 accessed. For example, a help-desk provider application and a system resources provider application may produce information in the same format or according to a predefined protocol. In various embodiments, the service context adapter 356 may be configured to adapt or convert this information received in a standardized format into the database fields 354 or even fields 352 employed by the federated DB 304.

In one embodiment, the provider applications 306 may be accessed as web services and may provide their respective data in a predefined format (e.g., Simple Object Access Protocol (SOAP), Extensible Markup Language (XML), etc.). In various embodiments, this format may be described or defined via a Web Services Description Language (WSDL) or other manner. It is understood that the above are merely a few illustrative examples to which the disclosed subject matter is not limited.

In various embodiments, the federated DB 304 may know or be aware of which provider applications 306 may exist and how to access them by relying or making use of an application or web service registry 308. In such an embodiment, each provider application 306 may register with or inform the registry 308 of the provider application 306's existence, the location or means by which a consumer (e.g., the federated DB 304) may access the provider application 306 (e.g., network address, port number, protocol, etc.), the services or information the provider application 306 may provide and, in various embodiments, other relevant details regarding the provider service 306. In various embodiments, the registry 308 may include a Universal Description, Discovery and Integration (UDDI) compliant or substantially compliant registry. It is understood that the above is merely one illustrative example to which the disclosed subject matter is not limited.

In one embodiment, the system 300 may include one or more provider applications 306. Each of these provider applications 306 may include various pieces of data or information 392 that are stored in whatever format or manner the application 306 makes use of. This data 392 may be accessed via the provider application 306's normal data application programmatic interface (API) 394.

However, as described above, the federated DB 304 may expect or require that information provided to the federated DB 304 by the provider applications 306 be provided in a standardized predefined and uniform format, and not the various formats or via the various access schemes used by the various provider applications 306. As such, in various embodiments, each provider application 306 may include, implement, or make use of a standard attribute interface (SAI) 396. Each implementation of the SAI 396 may be configured to allow a consumer (e.g., the federated DB 304) external to the provider application 306 to access the application data 392 in a standardized, uniform and predefined format and protocol. In the illustrated embodiment, the SAI 396 may allow the provider application 306 to function as a web service and be accessed by the federated DB 304 via a database query 316.

In various embodiments, the federated DB 304 may be configured to read or access information a given business service from the provider applications 306 but may not be configured to edit or write new information back to the provider applications 306. In such an embodiment, the service context may be an informative tool not an ameliorative or control tool. In another less preferred embodiment, however, the service context consumer 302 may be configured to specify edits or alterations in the retrieved data. In response, the federated DB 304 may be configured to write such change in the information back to the respective provider applications 306. In such an embodiment, the writing between the consumer application 302 and the federated DB 304 may occur as a single database transaction, similarly to the read transaction (e.g., request 312 and response 314). In yet another embodiment, the consumer application 302 may be configured write data or communicate commands directly to the provider applications 306. It is understood that the above are merely a few illustrative examples to which the disclosed subject matter is not limited.

In various embodiments, the issue of security may be considered in retrieving the service context. In one embodiment, the user or the consumer application 302 may be associated with one or more security credentials that dictate what data may be accessed and/or displayed. In such an embodiment, the federated DB 304 may be configured to filter the data received from the provider applications 306, and eventually provided to the consumer application 302 via the aggregated database query result 314 based upon the security credentials associated with the consumer application 302. In one embodiment, the security credentials may be provided via the request for service context 312. In such an embodiment, the presentation of the security credentials may be implicit (e.g., derivable via a username, etc.) or explicit (e.g., an authentication certificate or password included in the request 312, etc.).

In another embodiment, the user of consumer application 302 may be provided with an authentication or security check (e.g., login prompt, key code request, etc.) to access data securely stored on a provider application 306. In such an embodiment, the authentication requests and responses may be forwarded between the consumer application 302 and the provider application 306 via the federated DB 304. In another embodiment, the consumer application 302 and the provider application 306 may communicate directly or via another intermediary (e.g., an authentication server (not shown), etc.).

In one embodiment, the service context may be initially displayed without the un-authorized data and the user may then be able to actively request that the un-authorized data be displayed. In such an embodiment, this may cause the authentication UI (e.g., login screen, etc.), as described above, for the authorization of the requested data. In one embodiment, this may allow the service context to be displayed (at least partly) in a quick and unobtrusive manner, but may allow the display of the full or most complete service context if a user wishes or desires that initially un-authorized information. In various embodiments, the new authorization may cause a new request for the updated service context or may simple cause the consumer application 302 or the federated DB 304 to unlock or cease to filter out the previously unauthorized data.

It is understood that the above are merely a few illustrative examples to which the disclosed subject matter is not limited. Various schemes for filtering or removing unauthorized information in a business service context may be employed. Further various schemes for un-filtering or subsequently authorizing information in a business service context may be employed. In addition it is understood that the system 300 may support having different security models for the provider applications 306 such that the system 300 is security model heterogeneous.

In various embodiments, one or more of the provider applications 306 may include a multi-tenancy architecture. In this context, "multi-tenancy" refers to a principle in software architecture where a single instance of the software (e.g., application 306) runs or executes on a server, serving multiple client organizations (tenants). Multi-tenancy may be contrasted with a multi-instance architecture where separate software instances (or hardware systems) are set up for different client organizations. With a multi-tenant architecture, a software application is designed to virtually partition its data and configuration, and each client organization works with a customized virtual application instance.

In such an embodiment, the information provided by or available to a multi-tenancy provider application 306 may include data for a number of tenants. In such an embodiment, the provider application 306 or the federated DB 304 may be configured to filter the provided data by tenant, such that the consumer application 302 only receives information it the service context that is associated with the same tenant as the consumer application 302.

For example, the tenants of a provider application 306 may include Exxon, Sunoco, Shell, Chevron. The consumer application 302 may be associated with the Shell tenant. Therefore, in such an embodiment, the service context may be filtered to only include data about the business service that would be accessible or authorized for the Shell tenant. It is understood that the above is merely one illustrative example to which the disclosed subject matter is not limited.

In another embodiment, the service context may include both tenant-common data and tenant-specific data. For example, tenant-common data may include data that is the same regardless of what tenant is associated with the consumer application 302 or which tenant accesses the data. Such tenant-common data may include, for example: the system resource load of business service, the computing device name, business service uptime, etc. Conversely, the tenant-specific data may include data that differs for each tenant. Such tenants-specific data may include, for example: the number of failed email transmission attempt an email business service may experience, the number of failed login attempts to a business service, the number of help-desk requests, support tickets, or incidents for a business service, etc.

In such an embodiment, the system 300 may not filter the results of the service context request such that the tenant-common data is included in the service context. But, the system 300 may also filter tenant-specific data such that only tenant-specific data associated with the consumer application 302's tenant are included in the service context. For example, every tenant may be able to see or view, within their respective service contexts, the common-tenant data (e.g., business service status, etc.), but each tenant may only see or view their own tenant-specific data (e.g., a Mobile tenant may only view the number of business service incidents for the Shell tenant, likewise for other tenants, etc.).

In various embodiments, more than two levels or kinds of tenant data (e.g., tenant-common and tenant-specific) may be employed. In another embodiment, data may be associated with or have multiple or overlapping tenants. In such an embodiment, tenant-common data may not exist per se, but tenant-common data may effectively exist as all tenants are associated or authorized to access that data. Likewise, an overlapping security scheme (e.g., non-tenant based or considering tenants) may exist. It is understood that the above are merely a few illustrative examples to which the disclosed subject matter is not limited.

FIG. 4a is a diagram of an example embodiment of a user interface (UI) or UI element 401 in accordance with the disclosed subject matter. In various embodiments, the UI 401 may be included as part of or the service context user interface element (e.g., the service context user interface element 122 of FIG. 1). In one embodiment, the UI 401 may be displayed within or as part of a pop-up window or portion of a larger UI (e.g., in a Native View, as described above).

In the illustrated embodiment, the UI 401 may include an Attribute View of a Service Context Summary View. In such an embodiment, the UI 401 may provide a user with a "thumbnail sketch" or condensed version or view of what a given business service is and how it is performing. As described above, the information displayed in the UI 401 may have been received in an aggregated database query result. This aggregated database query result may have been produced or generated by a federated or at least partially virtual database based upon information regarding the business service that was, in turn, provided by a plurality of producer applications.

In one embodiment, the UI 401 may include a UI element (e.g., a label, etc.) that displays the name 410 of the business service that the service context pertains. In various embodiments, the UI 401 may also include a status indicator 418 UI element (e.g., a icon, a particular color, etc.). In the illustrated embodiment, the business service "Sales Automation" may be in a critical or imperfect state. Therefore, the status indicator 418 is illustrated as an orange "X" icon giving a user a quick indicator that the business service is in a "warning" state. It is understood that the above is merely one illustrative example to which the disclosed subject matter is not limited.

In various embodiments, an administrator, privileged user, or software developer may determine which database fields or pieces of information regarding the business service are to be displayed in this "thumbnail sketch" or condensed version or view of what a given business service is and how it is performing. In another, less preferred embodiment, the user may define what attributes or information they would like to see displayed. In such an embodiment, the UI 401 may display one or more predefined attributes or fields.

In one embodiment, these predefined fields may fall into two or more categories. In an example embodiment, three categories will be used. However, it is understood that various categories or partitions of business service fields or attributes may be employed and that the disclosed subject matter is not limited to any one example embodiment.

The first category are mandatory or fixed fields which may have been determined or defined by a software developer to be displayed in all service contexts and service context UI elements. (e.g., UI 401, etc.). Examples of such mandatory or fixed fields or attributes may include: the business service's status, any other business services or configuration items that are related to the service context's business service, etc. It is understood that the above are merely a few illustrative examples to which the disclosed subject matter is not limited.

The second category of fields or attributes may include default fields which are predefined by a software developer as included within the service context, but may be removed by an administrator, privileged user, or another user as deemed by the embodiment. In one embodiment, examples of such default fields or attributes may include, but are not limited to: the owner or user primarily associated with the business service, a description of the business service, an indicator of the level of business impact of the business service, a number of events or activities performed or experienced by the business service (e.g., completed change request, changes deployed, incidents, etc.), etc. In various embodiments, the various fields which include numbers (e.g., a number of events, etc.) may also include a listing or a pointer to those enumerated items. It is understood that the above are merely a few illustrative examples to which the disclosed subject matter is not limited.

The third category of fields or attributes may include optional fields that are by default omitted from a service context but may be added by an administrator, privileged user, or another user as deemed by the embodiment. In one embodiment, examples of such optional fields may include, but are not limited to: the number of maintenance hours experienced by the business service, the owner of the business service's contact information, the location of the business service, the priority level of the business service, the compliance status (e.g., to a standard or contractual compliment, such as uptime, etc.) of the business service, a number of outage records associated with the business service, a number of work orders or service tickets associated with the business service, a number of changes detecting the relation to the business service, a number of predictive events associated with the business service, etc. In various embodiments, the various fields which include numbers (e.g., a number of predictive events, etc.) may also include a listing or a pointer to those enumerated items. It is understood that the above are merely a few illustrative examples to which the disclosed subject matter is not limited.

In the illustrated embodiment, a number of attributes or fields of the service context may be displayed by UI element groups 412 and 414. As described above, some of these attributes or fields may be displayed or included as mandatory. Other attributes or fields may be included or displayed based upon a predefined scheme or set of rules established by an administrator or privileged user.

In the illustrated embodiment, UI element group 412 illustrates a set of attributes that are relatively static or do not allow for further interaction with a user. Examples of such fields or attributes may include, but are not limited to: a description of the business service, the owner of the business service, the status of the business service, and the impact priority of the business service. It is understood that the above are merely a few illustrative examples to which the disclosed subject matter is not limited.

In the illustrated embodiment, the UI element group 414 illustrates a set of attributes that are relatively dynamic and/or allow for further interaction with a user. In various embodiments, these attributes may include a number or a list of events or objects (e.g., service tickets, other business services, etc.) that may be condensed into a single numerical value. In another embodiment, the attributes of 414 may include list attributes, having several tuples (or rows) of values that are associated with each attribute. In such an embodiment, the user may be allowed or the UI may provide a means for to progressively disclosing such lists (e.g., via UI element 416, UI 402 of FIG. 4b, etc.).

Further, in various embodiments, these attributes may be governed or filtered based upon a set of rules that have been predefined by an administrator or privileged user. For example, one attribute shows that 25 incidents have occurred in the last hour. In such an embodiment, the set of rules may dictate the time frame (e.g., 1 hour, etc.) that will be considered with non-conforming or older incidents being filtered out.

In the illustrated embodiment, the numerical value of indicates within 1 hour is highlighted (e.g., in red, etc.) to indicate to a user that the value is of some importance. For example, the set of rules may dictate a threshold value or series of threshold values for the attribute or field. If the value of the field or items in the field (for fields containing a list of items), an indicator may be displayed to a user. In the illustrated embodiment, the UI element 416 may be colored (e.g., red, etc.). It is understood that the above is merely one illustrative example to which the disclosed subject matter is not limited.

As described above, various attributes or fields may be associated with additional data regarding the business service which is not immediately displayed in the Service Context Summary View UI 401. In such an embodiment, the UI 401 may include a UI element (e.g., UI element 416, etc.) that allows a user to display or view these additional, initially hidden data. In various embodiments, these UI elements 412 may include buttons, hyperlinks, context menus, etc. It is understood that the above are merely a few illustrative examples to which the disclosed subject matter is not limited.

FIG. 4b is a diagram of an example embodiment of a user interface 402 in accordance with the disclosed subject matter. In one embodiment, the UI 402 may illustrate a List View of a Service Context View. In one embodiment, the UI 402 may be displayed once a user has selected on of the expanding or list UI elements of the Attribute View of the Service Context (e.g., UI element 416 of FIG. 4a, etc.).

In various embodiments, the UI element 420 may display a list of all the items associated with the parent attribute or field. In the illustrated embodiment, the attribute "Related incidents in the last 1 hour" may be the parent attribute or field, and the various incidents (e.g., incident 422 "INC000000042156") may be the associated items. In the illustrated embodiment, the associated items themselves may include various fields or attributes. As such, in one embodiment, the list of associated items may be displayed in a table format. It is understood that the above is merely one illustrative example to which the disclosed subject matter is not limited.

In one embodiment, the UI 402 may include a UI element 422 for returning to the previous Service Context view (e.g., UI 401 of FIG. 4a, etc.). In various embodiments, the UI 402 may include a group of UI elements 419 configured to facilitate navigation between various Service Context views. In the illustrated embodiment, the UI element group 419 may include a button or icon for navigating back to the previous Service Context view, a button or icon for returning to a "Home" view (e.g., the Attribute View of FIG. 4a, etc.). In one embodiment, the group of UI elements 419 may include a button or icon to refresh the service context. In such an embodiment, the process for acquiring a service context, as described above, may be repeated and the new version of the service context may be displayed directly into the current view (e.g., UI 402). In various embodiments, the group of UI elements 419 may be displayed across a plurality or all views. It is understood that the above are merely a few illustrative examples to which the disclosed subject matter is not limited.

FIG. 4c is a diagram of an example embodiment of a user interface 403 in accordance with the disclosed subject matter. In one embodiment, the UI 403 may include a Related Configuration Items View of the Service Context. In such an embodiment, a user may view a list of business services or, in the illustrated embodiment, configuration items (e.g., Business Services, Applications, or Computer Systems, etc.) related to or associated with the business service that is the subject of the service context.

In the illustrated embodiment, the UI element group 430 may display a list of related configuration items 432 or business services, much as the list of incidents was displayed by UI element group 420 of FIG. 4b. In various embodiments, items included within a dependent or subordinate list, such as the related configuration items, may be selectable by a user. In various embodiments, the selection may display additional information regarding the item. In the illustrated embodiment, the name of a related configuration item may include a link UI element 434 that the user may select. Upon the selection of the related configuration item or business service a new service context may be generated and displayed. However, this new service context may associated with the selected item (e.g., CLT133), as opposed to the business service of the parent service context (e.g., Sales Automation, etc.). It is understood that the above is merely one illustrative example to which the disclosed subject matter is not limited.

FIG. 5a is a block diagram of an example embodiment of a system 500 in accordance with the disclosed subject matter. In various embodiments, the system 500 may be similar in many ways to the system 100 of FIG. 1. System 500 illustrates two variations that may occur separately or together in various embodiments o the disclosed subject matter.

In one embodiment, the apparatus or computing device 102 may include the federated DB 150. In some embodiments, the federated DB 150 may be included in one of the business server 106.

In one embodiment, the application 120 may include a service context administration UI 522. In such an embodiment, the administration UI 522 may facilitate the creation and definition of the fields and attributes that make up a service context, and any sets of rules that govern the way the fields or attributes are filtered or displayed. For example, the administration UI 522 may allow an administrator to select which optional or non-mandatory attributes or fields are included in a service context. In some embodiments, these service context definitions may apply regardless of the business service associated with the service context. In another embodiment, each business service or class or group of business services may be associated with their respective definitions of their service contexts.

As described above, in various embodiments, the administration UI 522 may allow an administrator to define or create a set of rules for filtering the attributes of the service context or dictating how the attribute is to be displayed to the user. For example, the administration UI 522 may allow an administrator to dictate that only incidents occurring within the last 1 hour may be included in the service context (as illustrated by FIG. 4a). Also, the administration UI 522 may allow an administrator to define threshold values or other conditional values that when met or exceeded cause the service context UI 122 to display a predefined indication to the user (e.g., the red UI element 416 of FIG. 4a). It is understood that the above is merely one illustrative example to which the disclosed subject matter is not limited.

Figure 5B:
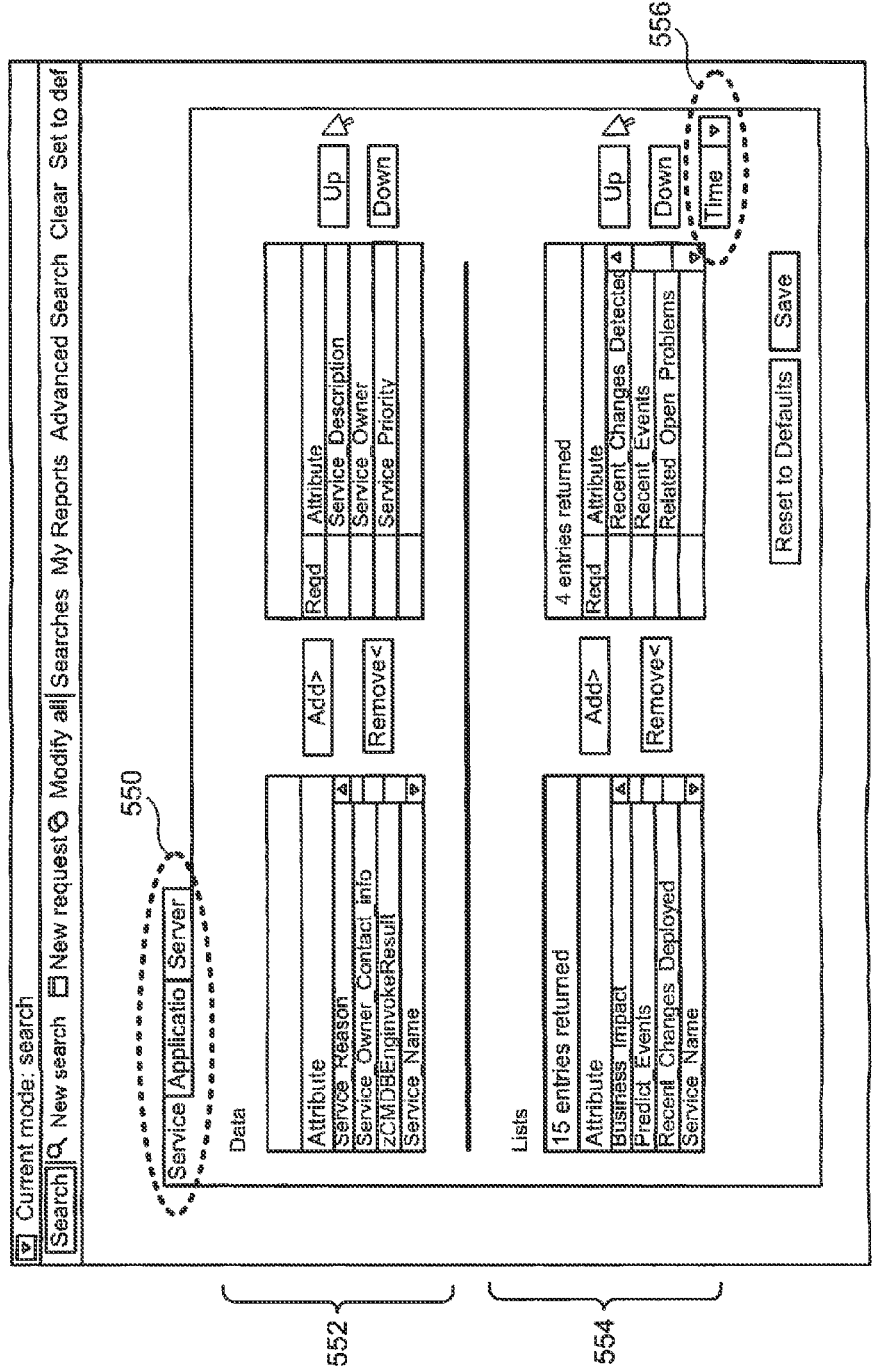
FIG. 5b is a block diagram of an example embodiment of a user interface in accordance with the disclosed subject matter.

FIG. 5b is a block diagram of an example embodiment of a user interface 501 in accordance with the disclosed subject matter. In the illustrated embodiment, the UI 501 includes a service context administration UI 522 that may be used by an administrator to define the attributes and fields included within a service context, and any sets or rules that filter the attributes or dictate how they are displayed to a user.

In one embodiment, the UI 501 may include a series of UI elements 550 that may allow an administrator to define various service context settings for various categories or groups of business services (e.g., web services, applications, or server, etc.). In various embodiments, the UI 501 may include UI element groups 552 and 554 that are configured to allow an administrator to set or define which of a group of possible business service attributes or fields to include in the service context. UI element group 552 may allow the definition or inclusion of the relatively simple or single valued attributes or fields. Whereas UI element group 554 may allow the definition or inclusion of the relatively complex, list, or multi-valued attributes or fields.

In various embodiments, the UI element 556 may allow an administrator to define various one or more sets of rules to filter which values are included in the service context (e.g., incidents occurring within the last hour, etc.), how the respective values are displayed to the user (e.g., highlighting values above a threshold, etc.), or other rules. It is understood that the above are merely a few illustrative examples to which the disclosed subject matter is not limited.

Figure 6:
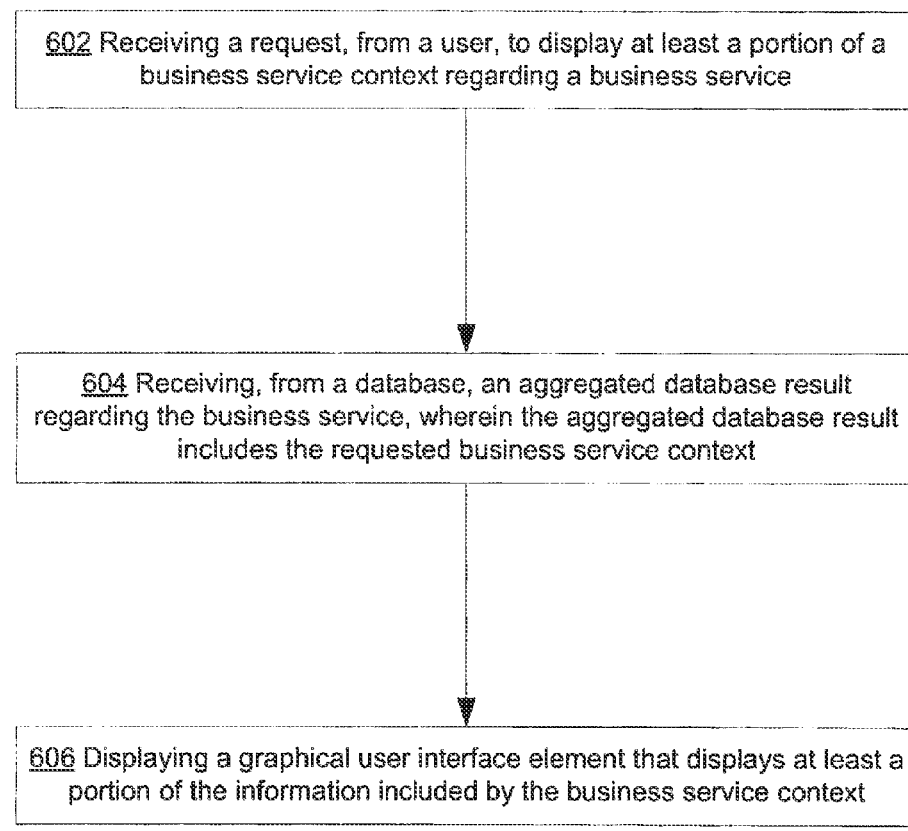
FIG. 6 is a flow chart of an example embodiment of a technique in accordance with the disclosed subject matter.

FIG. 6 is a flow chart of an example embodiment of a technique in accordance with the disclosed subject matter. In various embodiments, the technique 600 may be used or produced by the systems such as those of FIG. 1, 3, or 5a. Furthermore, portions of technique 600 may be used with or may produce user interfaces such as those of FIG. 2, 4a, 4b, 4c, or 5b. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, an application may receive a request, from a user, to display at least a portion of a business service context regarding a business service, as described above. In some embodiments, requesting may include selecting, from within the application, a user interface element associated with the business service, as described above. In various embodiments, one or more of the action(s) illustrated by this Block may be performed by the apparatuses or systems of FIG. 1, 3, or 5a, the application 120 of FIG. 1 or 5a, or the via the user interface 200 of FIG. 2, as described above.

Block 604 illustrates that, in one embodiment, an application may receive, from a database, an aggregated database result regarding the business service, as described above. In some embodiments, the aggregated database result may include the requested business service context, as described above. In such an embodiment, the business service context may, in turn, include information from a plurality of other applications, as described above. In various embodiments, receiving the aggregated database result may include receiving the aggregated database result as part of a single database query transaction, as described above. In such an embodiment, the aggregated database result may be provided by an at least partially virtual database that virtualizes database fields whose field values are provided by the plurality of other applications, as described above. In various embodiments, one or more of the action(s) illustrated by this Block may be performed by the apparatuses or systems of FIG. 1, 3, or 5a, the application 120 or database server 104 of FIG. 1 or 5a, as described above.

Block 606 illustrates that, in one embodiment, an application may display a graphical user interface element that displays at least a portion of the information included by the business service context, as described above. In some embodiments, display may include distilling the information included by the aggregated database result into an a condensed set of information regarding the performance of the business service; and displaying a summary view graphical user interface element that displays at least a portion of the condensed set of information regarding the performance of the business service, as described above.

In various embodiments, displaying may include displaying a first graphical user interface element that displays a first portion of information regarding the attributes of the business service, and in response to a user indicating they wish to view more information regarding at least one aspect of the business service, displaying a second graphical user interface element that displays a second portion of information regarding the attributes of the business service, as described above. In such an embodiment, the first graphical user interface element may include a window that displays a Summary View of the business service context, and the second graphical user interface element may include a window that displays a List View of items included in the second portion of the information, as described above.

In another embodiment, displaying may include displaying a set of required information regarding the business service, and displaying a set of optional information regarding the business service, wherein the set of optional information has been previously predefined by an administrative user, as described above. In yet another embodiment, displaying may include evaluating at least one of the displayed information to determine if a value of the information exceeds a predefined threshold, and if so, indicating to the user that the respective information has exceeded the threshold value, as described above.

In various embodiments, displaying may include displaying a business service linking user interface element that when selected causes a second business service context to be created and displayed, wherein the second business service context is associated with a second business service indicated by the business service linking user interface element, as described above. In some embodiments, a second user (e.g., an administrator, etc.) may define a set of rules to filter the information included by the business service context, as described above. In such an embodiment, displaying may include filtering the information to be displayed based upon the predefined set of rules, as described above.

In various embodiments, one or more of the action(s) illustrated by this Block may be performed by the apparatuses or systems of FIG. 1, 3, or 5a, the application 110 of FIG. 1 or 5a, or the via the user interfaces 401, 402, and 403 of FIGS. 4a, 4b, and 4c, as described above.

Figure 7:
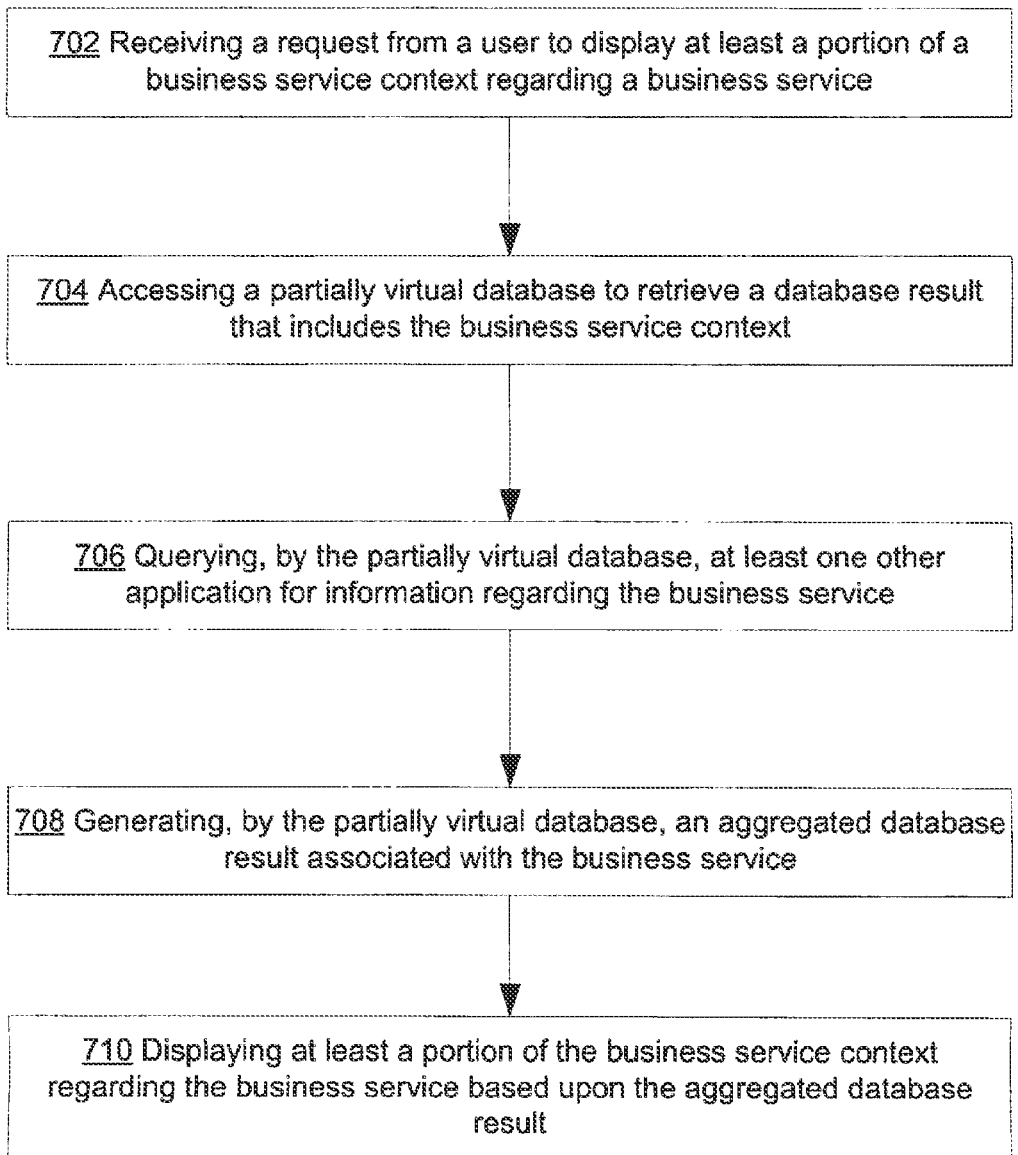
FIG. 7 is a flow chart of an example embodiment of a technique in accordance with the disclosed subject matter.

FIG. 7 is a flow chart of an example embodiment of a technique in accordance with the disclosed subject matter. In various embodiments, the technique 700 may be used or produced by the systems such as those of FIG. 1, 3, or 5a. Furthermore, portions of technique 700 may be used with or may produce user interfaces such as those of FIG. 2, 4a, 4b, 4c, or 5b. Although, it is understood that the above are merely a few illustrative examples to which the disclosed subject matter is not limited. It is understood that the disclosed subject matter is not limited to the ordering of or number of actions illustrated by technique 700.

Block 702 illustrates that, in one embodiment, an application may receive a request, from a user, to display at least a portion of a business service context regarding a business service, as described above. In various embodiments, one or more of the action(s) illustrated by this Block may be performed by the apparatuses or systems of FIG. 1, 3, or 5a, the application 120 of FIG. 1 or 5a, or the via the user interface 200 of FIG. 2, as described above.

Block 704 illustrates that, in one embodiment, an application may access a partially virtual database to retrieve a database result that includes the business service context, as described above. In various embodiments, one or more of the action(s) illustrated by this Block may be performed by the apparatuses or systems of FIG. 1, 3, or 5a, the application 120 or federated database 150 of FIG. 1 or 5a, or the via the user interface 200 of FIG. 2, as described above.

Block 706 illustrates that, in one embodiment, the partially virtual database may query at least one other application for information regarding the business service, as described above. In some embodiments, querying may include accessing the at least one other application via a web services interface that produces formatted query results that are standardized to a single predetermined formatting scheme regardless of the other application queried, and adapting the information, included in the query result from the respective other application, to the partial virtual database fields of the partially virtual database, as described above. In another embodiment, querying may include retrieving a list of other applications to query from a provider application registry in which the other applications have previously registered, as described above.

In various embodiments, the partially virtual database may be configured to read information regarding the business service from at least one other application, but may not write information regarding the business service from the at least one other application, as described above. In some embodiments, the partially virtual database may include at least one non-virtual field associated with the business services that are stored within the partially virtual database, and at least one virtual field associated with the business service whose field value is provided by the at least one application as a result of querying the at least one application, as described above.

In various embodiments, one or more of the action(s) illustrated by this Block may be performed by the apparatuses or systems of FIG. 1, 3, or 5a, the applications 180 or federated database 150 of FIG. 1 or 5a, as described above.

Block 708 illustrates that, in one embodiment, the partially virtual database may generate an aggregated database result associated with the business service, as described above. In various embodiments, the aggregated database result may include information provided by the at least one other application, as described above. In one embodiment, generating may include providing a database result that includes at least one of both a non-virtual field and a virtual field in a single database retrieval operation, as described above.

In various embodiments, the user of Block 702 may be associated with a security credential, as described above. In such an embodiment, generating an aggregated database result may include filtering the information provided by the at least one other application based upon the user's security credentials, as described above. In another embodiment, the filtering based upon the security credentials may occur at the consumer application or, in yet another embodiment, each of the other provider applications, as described above.

In some embodiments, the user's security credential may be associated with a tenant, and at least one of the at least one other applications may provide a multi-tenant business service, as described above. In such an embodiment, filtering information based upon the user's security credential may include not filtering a first set of information, provided by the at least one other application, that is common to all tenants of the multi-tenant business service, and filtering, based on the user's associated tenant, a second set of information, provided by the at least one other application, that is specific to individual tenants of the multi-tenant business service, as described above.

In various embodiments, one or more of the action(s) illustrated by this Block may be performed by the apparatuses or systems of FIG. 1, 3, or 5a, the applications 180 or federated database 150 of FIG. 1 or 5a, as described above.

Block 710 illustrates that, in one embodiment, an application may display at least a portion of the business service context regarding the business service based upon the aggregated database result, as described above. In various embodiments, one or more of the action(s) illustrated by this Block may be performed by the apparatuses or systems of FIG. 1, 3, or 5a, the application 120 of FIG. 1 or 5a, or the via the user interfaces 401, 402, and 403 of FIGS. 4a, 4b, and 4c, as described above.

Figure 8:
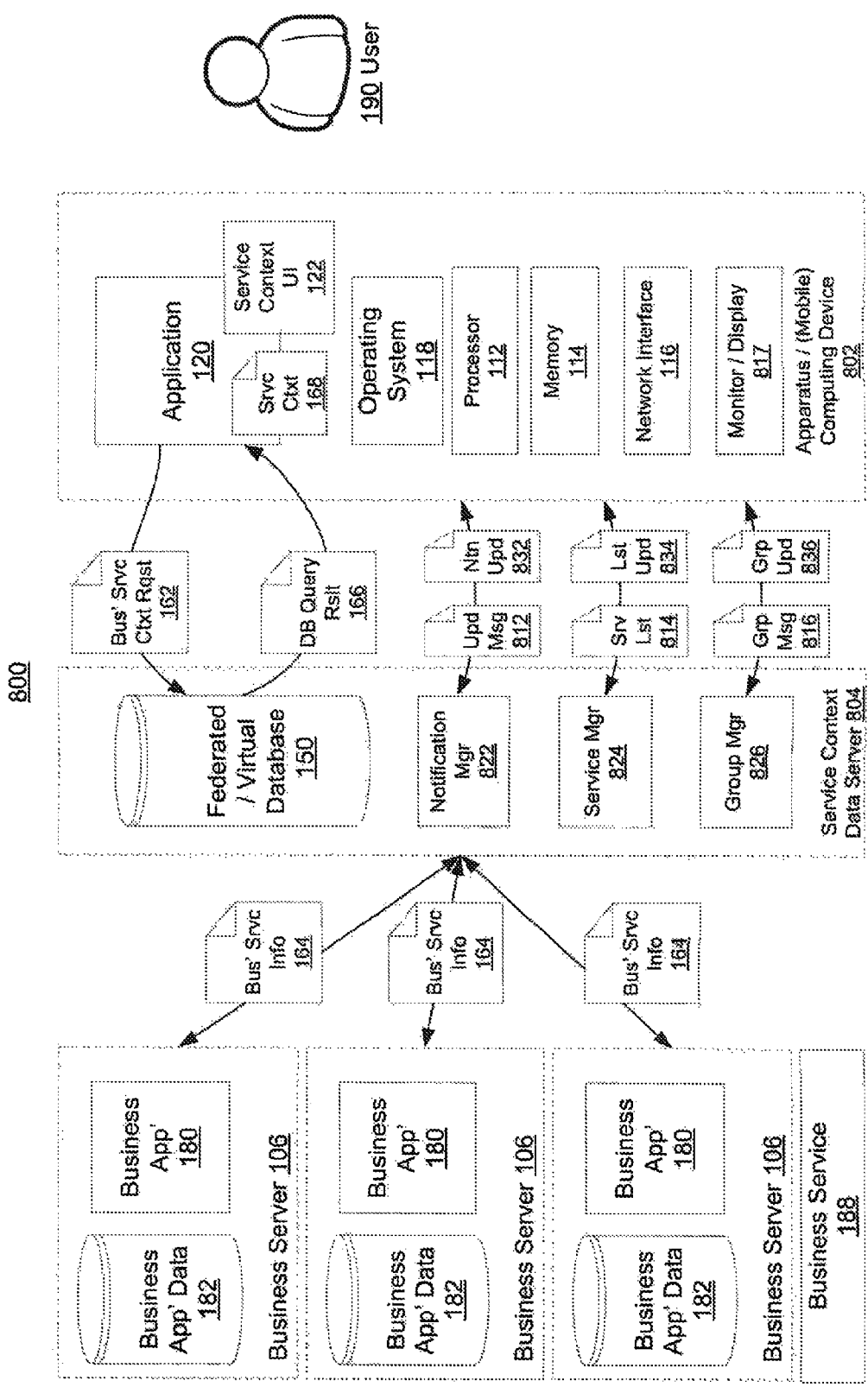
FIG. 8 is a block diagram of an example embodiment of a system in accordance with the disclosed subject matter.

FIG. 8 is a block diagram of an example embodiment of a system 800 in accordance with the disclosed subject matter. In the illustrated embodiment, a system 800 in which the apparatus or computing device 802 includes or is a mobile computing device or mobile device (e.g., a smartphone, a tablet, etc.).

In various embodiments, system 100 of FIG. 1 may be configured to generate a "widget" that provides a consistent, high performing summary of a Service given the user's current context in some application. Further, the system 100 may be configured to provide data access mechanisms for multiple applications to incorporate Service summary data into their own native user interfaces.

Conversely, in one embodiment, the system 800 of FIG. 8 may be configured to provide the same or similar data but via a user experience that is appropriate from a mobile user. For example, in one such embodiment, launching a service context UI may not be done from within another UI of an application. In addition, the system 800 may be configured to provide features suitable for a mobile device such as receiving notifications and collaboration, etc. It is understood that the above is merely one illustrative example to which the disclosed subject matter is not limited.

In some embodiments, the system 800 may be configured to provide a constant look-and-feel to the service context UI 122 in that it looks substantially the same no matter where or how the UI 122 is launched. In one embodiment, the service context within a mobile device context may include single or limited purpose interaction with the user 190, provide a quick means for the user to view the service context (e.g., a 1-2 second response time, etc.). In various embodiments, the application 120 may be substantially independent or a stand-alone application that merely provides the UI 122 and no other functions. However, in another embodiment, for example on a tablet or mobile device with a sufficiently large screen, the generation and display of the UI 122 may occur similarly to that of the system 100 of FIG. 1, as described above. In yet another embodiment, the system 800 may be configured to take advantage of communication and collaboration capabilities of the mobile device, as described below.

Comparing the systems 100 and 800 of FIGS. 1 and 8, respectively, in the system 100, in one embodiment, the may be configured to launch or display the UI 122 as derivative of the native UI of the application or as pop-up or tooltip element on-top of the native the application. Conversely, in one embodiment, the system 800 may be configured to display the UI 122 as the main or sole UI of the application, as described above. In another embodiment, the system 100 may be configured to get the business service identifier (ID) or other context identifiers or names from the UI context of the launching application. Conversely, in a mobile embodiment the system 800 may be configured to get the business service ID or name from a list of business services presented to the user. In yet another embodiment, system 100 may constrain the user to only the services presented or associated with the launching application. In various mobile embodiments, the user 190 may be able to alter the query to generate a different list of business services or otherwise manipulate the list of business services, as described below. It is understood that the above are merely a few illustrative examples to which the disclosed subject matter is not limited.

Further, in some mobile embodiments, a user may be able to communicate or transmit a service context using various capabilities of the mobile device or communication protocols (e.g., Bluetooth, email, short messaging service, etc.). In another mobile embodiment, the user may be able to register for or receive various push notifications about changes to certain services or attributes of various business services, as described below. In yet another mobile embodiment, a user may be able to join communities or groups of users who are interested in a particular business service or other system resources, as described below. In various embodiments, the system 100 within a desktop or non-mobile context may not be configured to provide these abilities or services. It is understood that the above are merely a few illustrative examples to which the disclosed subject matter is not limited.

In some embodiments, the mobile device 802 may be similar to or include the computing device 102 of FIG. 1. In various embodiments, the mobile device 802 may include at least one display or monitor 817 configured to visually display information to the user 190. In some embodiments, the monitor 817 may include a touch screen, a liquid crystal display (LCD), or other form of display technology. In some embodiments, other hardware components (not illustrated), such as, for example, an input device, keyboard, mouse, touchpad, loud speakers, a camera, a sensor, etc. It is understood that the above are merely a few illustrative examples to which the disclosed subject matter is not limited. In various embodiments, the computing device 102 of FIG. 1 may also include these hardware devices.

In such an embodiment, the application 120 includes a mobile application executing on the mobile device 802. In some embodiments, the application 120 may be a special purpose application 120 configured simply to request, retrieve and display a service context 168. Such an application 120 is illustrated in FIGS. 10a-10h. It is understood that the above is merely one illustrative example to which the disclosed subject matter is not limited. In yet another embodiment, the application 120 may be configured to provide additional services or functionality (e.g., an IT management application, etc.)

In various embodiments, the application 120 may be configured to request, receive, and display a service context 168, similarly to that as described above. However, in some embodiments, the technique may be more complex than that described above.

In one embodiment, the application 120 may not be directly associated with a business service 188, as the application 120 might be if the application 120 was generally configured to interact with or provide a front-end to a business service, as described above. In such an embodiment, user 190 or application 120 may be configured to select a business service 188 from a plurality of possible business services 188. In such an embodiment, once the desired business service 188 is selected, the application 120 may request an associated business service context 168, as described above.

In various embodiments, the user 190 may be required to manually enter the desired business service 188 into the application 120. In another embodiment, a list 814 of possible business services may be provided by a service manager 804 included by the Service Context Data Server 804 or other computing entity. In such an embodiment, the business service list 814 may be maintained by the Service Context Data server 804. In various embodiments, the Service Context Data Server 804 may be similar to the DB Server 104 of FIG. 1.

It is understood that Service Context Data Server 804 may include various hardware components, such as, a processor, memory, network interface, etc. similarly to those of DB server 104 of FIG. 1 which are not illustrated in this figure. In various embodiments, one or all of the components, such as, the notification manager 822, service manager 824, or the group manager 826 may be included in other computing devices or entities and may not be integrated or co-located with the Service Context Data Server 804. It is understood that the illustrated is merely one example to which the disclosed subject matter is not limited.

In some embodiments, the service manager 824 may transmit the service list 814 to the mobile device 802 in response to a request by the mobile device 802. In various embodiments, the service manager 824 may periodically push or transmits a service list 814 to the mobile device 802. In some such embodiments, the service list 814 may only be pushed to the mobile device 802 if there is a change in the service list 814 (e.g., an addition or removal of a business service 188 from the list 814, etc.). In another embodiment, predefined criteria or a set of rules may dictate when the service manager 814 communicates the service list 814 to the mobile device 802.

In various embodiments, the service manager 824 may associate one or more service lists 814 with a particular user 190 or a group of users. For example, in one embodiment, a plurality of service lists 814 may be maintained and when the mobile device 802 requests a service list 814, the service manager 824 may determine which of the plurality of service lists 814 to send the mobile device 802. In such an embodiment, the user 190 may be included with a user group that includes, for example, administrators located in Houston, Tex. The service manager 824 may then select a service list 814 associated with that Houston administrator group and not provide other service lists 814 that are associated with other user groups (e.g., salesmen located in Houston, Tex.; administrators located in San Francisco, Calif.; etc.).

In one embodiment, the user 190 may be able to update the service list 814 via the application 120. In such an embodiment, the application 120 may be configured to transmit the modified service list 814 (or a portion thereof) back to the service manager 824 for storage and later retrieval. In another embodiment, the application 120 may transmit messages 832 (e.g., write requests, request to delete a particular business service, etc.) to the service manager 824. In such an embodiment, the service manager 824 may then be configured to alter or edit the associated service list 814 and/or provide appropriate success or failure messages back to the mobile device 802.

In one embodiment, the service manager 824 may be configured to store cascading or overlapping service lists 814. For example, a user 190 may be associated with a number of user groups (e.g., administrators in Houston, Tex., all employees in Houston, Tex., employees that Boss Bob manages, etc.). In yet another embodiment, the user 190 may have a personalized list of business services 188 that the user 190 has added (or deleted or blacklisted, etc.). In such an embodiment, the service manager 824 may be configured to transmit each service list 814 to the application 120. In another embodiment, the service manager 824 may be configured to dynamically generate a composite service list 814 based upon the various service lists 814 that are associated with the user 190. In various embodiments, this generation may be based upon a set of predefined priority rules. For example, the existence of a business service 188 on the list 814 associated with "employees that Boss Bob manages" may override the blacklisting or removal of the business service 188 from the user 190's personal service list 814.

In some embodiments, the user 190 may actively select the business service from the list 814. In another embodiment, the application 120 may automatically select the most recently used or selected business service 188. In such an embodiment, the user 190 may be able to manually select another business service 188 or override the application 120's automatic selection. In yet another embodiment, the business service 188 may be automatically selected based upon a message from the Service Context Data Server 804 or another user/mobile device (not illustrated). In such an embodiment, the message may include an update message 812 or a group message 816, as described below.

In various embodiments, this service list 814 may be stored and/or transmitted as a text or a binary file. In one embodiment, the service list 814 may include a file that includes data formatted in an Extensible Markup Language (XML) format or a similar format. In one specific embodiment, the service list 814 may include a file stored in a variation of Property List (plist) format (e.g., an iOS plist format, a GNUstep plist format, etc.). It is understood that the above are merely a few illustrative examples to which the disclosed subject matter is not limited.

In the illustrated embodiment, once a particular business service 188 has been selected, the application may request a business service context 168 from the Service Context Data Server 804, as described above. In such an embodiment, once the business service context 168 has been received, it may be displayed via a service context UI 122, as described above.

FIG. 10e is a diagram of an example embodiment of a user interface (UI) 1094 in accordance with the disclosed subject matter. In one embodiment, the UI 1095 may display a business service context within or on a mobile computing device 802. In some embodiments, this UI 1095 may be referred to as the Service Context Summary View. In such an embodiment, further UI elements may also be displayed In the illustrated embodiment, the UI 1095 may display via a UI element 1054 (e.g., a tile bar or header) which business service 804 the business service context is associated with. Further the UI 1095 may include an element 1052 to display the service context or a portion thereof.

In various embodiments, various UI elements 1058 may be configured to cause the mobile device 802 to display other portions of the service context or retrieve and display other service contexts. Examples of such displays are discussed below in reference to FIGS. 10a-10h. These UI elements 1058 may effectively cause the mobile device 802 to display the sub-views, as described above, and may result in the displaying various embodiments, such as, a list view configured to display additional inform regarding the service in an alternate format. In various embodiments, various UI elements or views may focus on various aspects of the selected business service. It is understood that the above are merely a few illustrative examples to which the disclosed subject matter is not limited. In another embodiment, the UI elements 1058 may include business service linking UI elements 1058 that cause the retrieval and display other service contexts, as described above.

Returning to FIG. 8, in some embodiments, Service Context Data Server 804 may include notification manager 822. In such an embodiment, the notification manager 824 may be configured to push or transmit an update message 812 to the application 120, OS 118, or mobile device 802 when a pre-defined event occurs (e.g., a business service 188 generates an event, such as, an incident ticket; a message has been sent to the user 190 by another user; etc.).

In one embodiment, the update message 812 may cause the application 120 to automatically retrieve a service context 168 for a business service 188 (typically a business service 188 associated with or indicated by the update message 812). In some embodiments, the update message 812 may cause application 120 or OS 118 to indicate, to the user 190, that a notification message has arrived. In various embodiments, this may occur via a UI element overlaid upon the application 120's icon (as shown in FIG. 10a). In another embodiment, this may occur via a pop-up windows or other UI element. It is understood that the above are merely a few illustrative examples to which the disclosed subject matter is not limited.

In various embodiments, the user 190 or application 120 may transmit update configuration messages 834 to the notification manager 822 indicating rules or criteria for which the notification manager 822 is to generate or transmit subsequent update messages 812. For example, such rules may include "any changes in information for the business service associate current service context 168", "if information (e.g., incidents, service tickets, sales values, etc.) associated with a particular business service 188 exceed or falls below a certain threshold value", etc. It is understood that the above are merely a few illustrative examples to which the disclosed subject matter is not limited.

In another embodiment, the notification manager 822 may receive notification rules from an administrator logged into or having direct or remote access to the Service Context Data Server. In yet another embodiment, the notification manager 822 may receive notification rules from update configuration messages 834 sent by other users (not illustrated). For example, a manager may update the notification rules associated with their employees. It is understood that the above are merely a few illustrative examples to which the disclosed subject matter is not limited.

In one embodiment, the notification manager 822 may base the generation of its notification or update messages 812 on, at least in part, values or messages received from a group manager 826 that is included by the Service Context Data Server 804. In various embodiments, the group manager 826 may be configured to group a plurality of users 190 together for processes of notifications, messaging, access rights, or other processing tasks. In a preferred embodiment, the group of users 190 may include a community that has a common interest in some system resource(s) (e.g., business service 188, etc.). It is understood that the above is merely one illustrative example to which the disclosed subject matter is not limited.

As described above, in various embodiments, the multiple users 190 may be associated for purposes of access to a service list 814. In such an embodiment, the service manager 824 may determine which users 190 are part of those associations by asking a group manager 826. Likewise, with the notification manager 822.

In various embodiments, the group manager 826 may also be configured to distribute or transmit messages 816 to all the members or users 190 associated with one or more groups of users 190. In another embodiment, the group manager 826 may ask or make use of the notification manager 822 to perform the actual transmission of the information via the update message 812.

In various embodiments, a user 190 may wish to send a business service context 168 to another user 190, as described above. In some embodiments, the user 190 may not just wish to send the business service context 168 to a single other user, but to a group of users (e.g., the user 190's team at work, etc.). Instead of sending individual messages to each user, the user 190 or application 120 may send a single group update message 836 to the group manager 826.

In such an embodiment, the group manager 826 may then forward and/or re-format and re-send the information of the message to the various users associated with the group of users for whom the group update message 836 was destined. In an alternate embodiment, the group manager 826 may instead inform the notification manager 822 that a notification event has occurred for users associated with the group update message 836 was destined. The group manager 826 may provide the notification manager 822 with the information (e.g., business service context 168, etc.) included in the group update message 836. The notification manager 822 may then send out an update message 812 to the various users.

For example, a business service 188 may generate a notification event (e.g., a critical hardware failure, etc.) that the notification manager 822 deems to be warrant the transmission of an update message 812. The notification manager 822 may check its internal business service-to-user associations and determine that a group of administrative users (e.g., administrators working for Boss Bob, etc.) should receive the update message 812. In various embodiments, the update message 812 may include a business service context 168 or a DB query result 166 the associated business service 188.

In one embodiment, the notification manager 822 may maintain a list of the affected users. In another embodiment, the notification manager 822 may simply know that the group should receive the update message 812 and may ask the group manager 826 for the specific users 190 included in the group. In yet another embodiment, the notification manager 822 may transmit an update message 812 to the group manager 826

(e.g., as a group update message 836, etc.). The group manager 826 may then essentially forward the update message 812 as a group message 816 to the affected users 190 of the targeted group of users.

In one example embodiment, the user, for example, Jane (as a member of the target group) or Jane's mobile device may receive the update message 812 or group message 816 (depending upon the embodiment). The OS 118 or application 120 may provide a GUI element that indicates that Jane has received a notification or message. Jane may then check this message and view the business service context 168 that informs her that a piece of hardware has failed (in this example). Other users of the group who also receive the update message 812 may include, for purposes of this example, Boss Bob, Dick, and Sally.

Jane may be the "on-call" administrator during this event. Jane may then replace or repair the piece of hardware and restore the business service 188. Jane may then send a group update message 836 (targeted to the group of administrators working for Boss Bob) that says that "Jane has fixed everything and everything is OK".

The group manager 826 may receive this group update message 836 and either forward it as a group message 816 or ask the notification manager to send the information the message 836 includes as an update message 812 (depending upon the embodiment) to the targeted group. Boss Bob may receive the message 836 similarly to that described above and may rest easy knowing Jane has fixed everything. It is understood that the above is merely one illustrative example to which the disclosed subject matter is not limited.

In various embodiments, the group update message 836, group message 816, and/or update message 812 may include text messages and/or binary messages (e.g., pictures, service contexts 168, etc.). In various embodiments, these messages may adhere to predefined protocol (e.g., notification message related to the mobile device's OS 118, email format, text messaging format, etc.). It is understood that the above are merely a few illustrative examples to which the disclosed subject matter is not limited.

In various embodiments, the group update message 836 may allow a user 190 to add or remove themself or other users from various groups and/or perform various other management functions (e.g., set permissions, set business service associations, etc.).

In some embodiments, the notification manager 822, service manager 824, and/or the group manager 826 may make use of a publish-subscribe model of distribution of their respective messages. In another embodiment, the managers 822, 824, and/or 826 may broadcast their respective messages and the application 120 or OS 118 may be configured to filter out messages as needed. It is understood that the above are merely a few illustrative examples to which the disclosed subject matter is not limited.

FIG. 9 is a flow chart of an example embodiment of a technique 900 in accordance with the disclosed subject matter. In various embodiments, the technique 900 may be used or produced by the systems such as those of FIG. 1, 3, or 8. Although, it is understood that the above are merely a few illustrative examples to which the disclosed subject matter is not limited. It is understood that the disclosed subject matter is not limited to the ordering of or number of actions illustrated by technique 900.

FIG. 9 illustrates one possible form of a user's interaction with an application executed by a mobile device that is configured to display a business context service, as described above. It is understood that other interactions with the application and operations performed by the application are possible. Some of the user interfaces which support these operations and interactions are described in more detail below.

Block 902 illustrates that, in one embodiment, a business service context application may be executed on or by a mobile device, as described above. In such an embodiment, the application may be configured to have a single purpose, retrieving and displaying business service contexts. In another embodiment, the application may provide a richer functionality (e.g., an IT management application) that also supports the retrieval and display of a business service context, as described above. In various embodiments, one or more of the action(s) illustrated by this Block may be performed by the apparatuses or systems of FIG. 1, 3, or 8, the application of FIG. 1, 3, or 8, as described above.

FIG. 10a is a diagram of an example embodiment of a user interface (UI) 1091 in accordance with the disclosed subject matter. In various embodiments, the UI element 652 may cause the application to be launched (or executed by the mobile device) or brought to the foreground of the mobile device's UI (in embodiments that include a multi-tasking operating system). It is understood that the above is merely one illustrative example to which the disclosed subject matter is not limited.

Block 904 illustrates that, in one embodiment, the application may be configured to display a list of business services, as described above. In some embodiments, the application may automatically retrieve the list of business services, or, in another embodiment, the user may manually enter one or more business services, as described above. In various embodiments, one or more of the action(s) illustrated by this Block may be performed by the apparatuses or systems of FIG. 1, 3, or 8, the application of FIG. 1, 3, or 8, as described above.

Figure 10B:
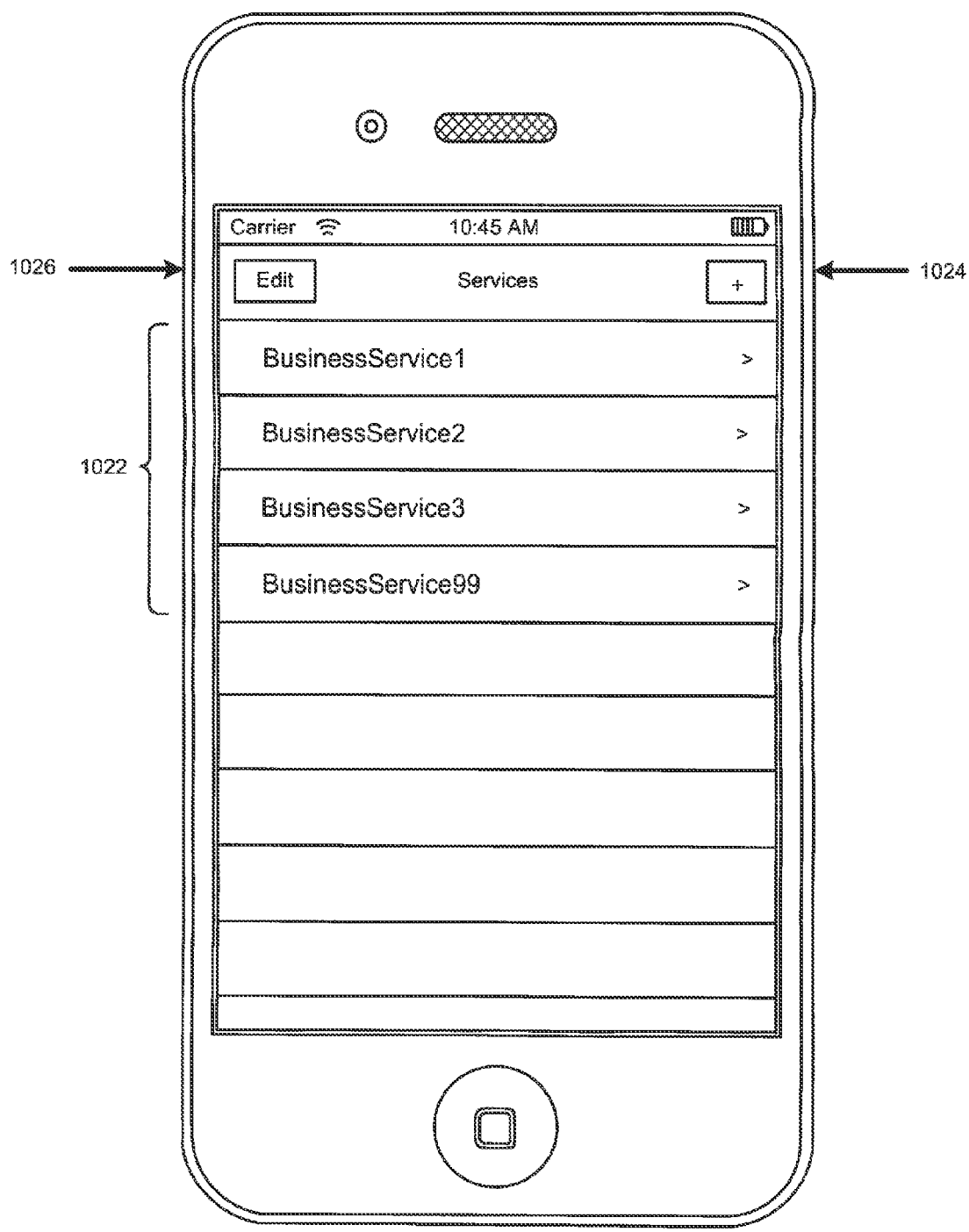
FIG. 10b is a diagram of an example embodiment of a user interface in accordance with the disclosed subject matter.

FIG. 10b is a diagram of an example embodiment of a user interface (UI) 1092 in accordance with the disclosed subject matter. In one embodiment, the UI 1092 may display a list 1022 of business services about which the user may request a business service context. In one embodiment, the UI 1092 may include a UI element 1024 (e.g., a button, etc.) via which the user may start another UI (e.g., UI 1094 of FIG. 10d) that allows a user to manually enter or add another business service. In one embodiment, the UI 1092 may include a UI element 1026 (e.g., a button, etc.) via which the user may start another UI (e.g., UI 1093 of FIG. 10c) that allows a user to edit the list of business services.

As described above, in various embodiments, the user may wish to edit or manipulate the list of business services. In such an embodiment, the user may select an UI element 1026 and be provided with a UI (e.g., UI 1093 of FIG. 10c) that allows a user to edit the list of business services.

Figure 10C:
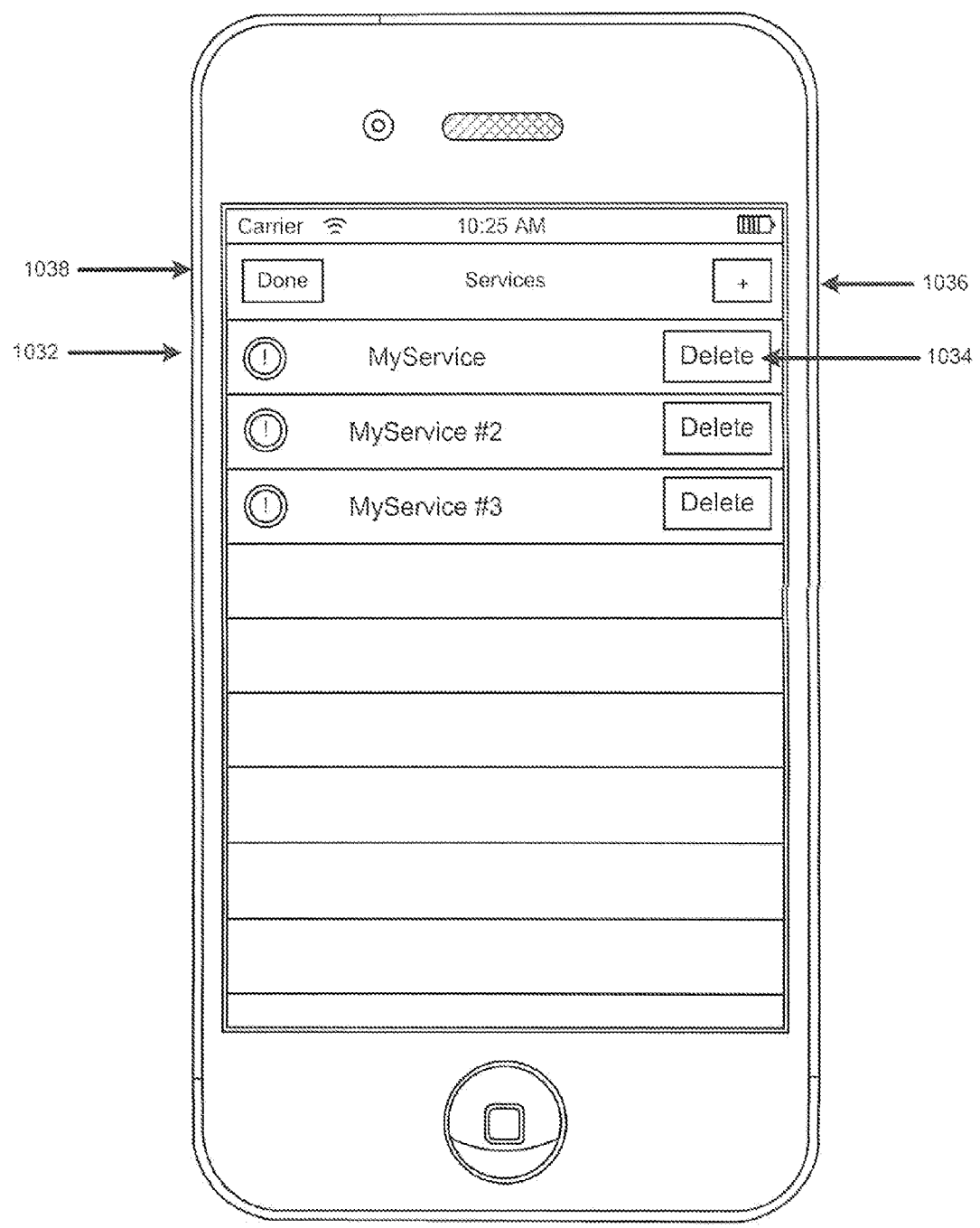
FIG. 10c is a diagram of an example embodiment of a user interface in accordance with the disclosed subject matter.

FIG. 10c is a diagram of an example embodiment of a user interface (UI) 1093 in accordance with the disclosed subject matter. In such an embodiment, the UI 1093 may provide a user with a way to edit the list of business services. In some embodiments, this editing may include adding a business service, deleting a business service, altering the order or hierarchy of the list of business services, etc.

In various embodiments, the UI 1093 may include one or more UI elements 1032 (e.g., buttons, a touch-n-drag region, etc.) by which the user may re-order the business services within the list. In some embodiments, the list of business services may include a hierarchical organization (e.g., folders, etc.). In such an embodiment, the user may re-order or re-arrange the business services within such a hierarchy.

In various embodiments, the UI 1032 may include a UI element 1034 that, when selected, allow a user to delete or remove a business service from the list of business services.

In one embodiment, the UI 1032 may include a UI element 1036 that allows a user to add or manually enter one or more business services. In one embodiment, this may cause the UI 1094 of FIG. 10*d* to be displayed. In another embodiment, this may allow a user to select a list of business services from a plurality of lists, for example, that are available on the Service Context Data server of FIG. 8, another remote computing device, or are stored within the mobile device.

In one embodiment, the UI 1093 may include a UI element 1034 (e.g., button, pull down menu, etc.) that indicates that the user wishes to save the entered business service to the list of business services. In various embodiments, once the changes or alterations to the list of business services has been made, the list (or the edits thereof) may be transmitted back to the Service Context Data server or a remote server for storage and/or future synchronization. It is understood that the above are merely a few illustrative examples to which the disclosed subject matter is not limited.

As described above, in another embodiment, the user may wish to r to manually enter or add another business service. In such an embodiment, the user may select the UI element 1024 of FIG. 10*b* or the UI element 1036 of FIG. 10*c*.

Figure 10D:
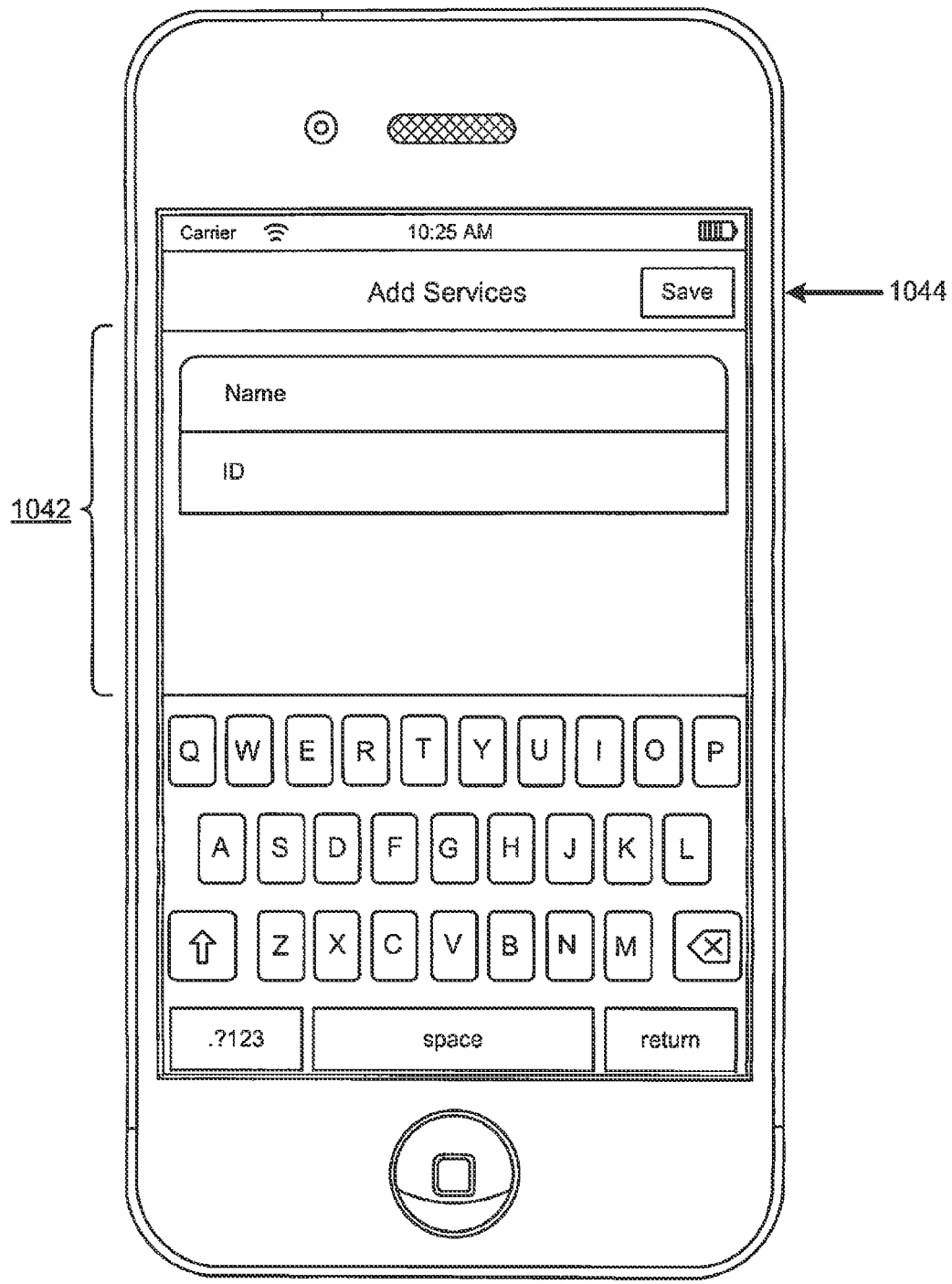
FIG. 10d is a diagram of an example embodiment of a user interface in accordance with the disclosed subject matter.

FIG. 10*d* is a diagram of an example embodiment of a user interface (UI) 1094 in accordance with the disclosed subject matter. In such an embodiment, the UI 1094 may provide a user with a way to manually add a business service to the list of business services. In some embodiments, if no list of business services exists or is known to the application, a UI 1094 may be used in order for the user to manually enter a desired business service. In another embodiment, the UI 1094 may be used to enter or accept a business service that is communicated to the user (e.g., via a message from a another user, etc.) or if the user becomes aware of a business service by some out-of-bounds means.

In various embodiments, the UI 1094 may include one or more UI elements 1042 (e.g., text fields, buttons, virtual keyboard, etc.) by which the user may enter or select a business service. In various embodiments, fields to be entered may include, but are not limited to, the name of the business service, an identifier associated with the business service, a network address of the business service, any identification or authentication credentials (e.g., username, password, etc.) that are associated with the user or would give the user access to the business service, etc. In one embodiment, the UI 1094 may include a UI element 1044 (e.g., button, pull down menu, etc.) that indicates that the user wishes to save the entered business service to the list of business services. In various embodiments, the UI element 1044 or other UI elements may allow a user to clear the fields of UI elements 1042, place predefined values (e.g., authentication credentials, domain information, etc.) within the fields of UI elements 1042, etc. In various embodiments, other UI elements may be included by UI 1094.

Returning to FIG. 9, Block 906 illustrates that, in one embodiment, a user may cause a mobile computing device to select a business service from a plurality or list of possible business services, as described above. In various embodiments, one or more of the action(s) illustrated by this Block may be performed by the apparatuses or systems of FIG. 1, 3, or 8, the application of FIG. 1, 3, or 8, as described above.

As described above, in various embodiments, the application may display a list of business services from which the user may select a particular business service. Using that selected business service, the application may then automatically request from a database a business service context associated with the selected business service, as described above.

Block 908 illustrates that, in one embodiment, the mobile computing device may receive a request from a user to display at least a portion of a business service context regarding a business service, as described above. In some embodiments, this may include launching the application. In various embodiments, one or more of the action(s) illustrated by this Block may be performed by the apparatuses or systems of FIG. 1, 3, or 8, the application of FIG. 1, 3, or 8, as described above.

Block 910 illustrates that, in one embodiment, that the mobile device may query a database for a business service context of the select business service, and receiving in response an aggregated database result regarding the business service that include the requested business service context, as described above. In various embodiments, one or more of the action(s) illustrated by this Block may be performed by the apparatuses or systems of FIG. 1, 3, or 8, the application of FIG. 1, 3, or 8, as described above.

Block 912 illustrates that, in one embodiment, the mobile device may display a graphical user interface (GUI) on the mobile device that displays at least a portion of the information included by the business service context, as described above. In various embodiments, one or more of the action(s) illustrated by this Block may be performed by the apparatuses or systems of FIG. 1, 3, or 8, the application of FIG. 1, 3, or 8, as described above.

In one embodiment, the GUI may be similar to the UI 1095 of FIG. 10*e*, as described above. In another embodiment, the GUI may be similar to the UI 1096 of FIG. 10*f*, as described below.

FIG. 10*e* is a diagram of an example embodiment of a user interface (UI) 1095 in accordance with the disclosed subject matter. In such an embodiment, the UI 1095 may provide a user with a summary view of the business service context. It is understood that the above is merely one illustrative example to which the disclosed subject matter is not limited.

In one embodiment, the UI 1095 may include a UI element 1054 (e.g., a label, a title bar, etc.) that displays the business service associated with the current business service context (e.g., "BusinessService1", etc.).

In such an embodiment, the UI 1095 may include one or more UI elements 1052 that provide detailed information about a portion of the business service context. In the illustrated embodiment, a user can see that the business service "BusinessService1" has an attribute called "Incidents" and that there are 4 "Incidents". In one embodiment, by selecting one of the UI elements 1058 the user may cause the UI 1096 of FIG. 10*f* to be displayed. It is understood that the above is merely one illustrative example to which the disclosed subject matter is not limited.

In one embodiment, the UI 1095 and other UIs may include a UI element 1056 that facilitates the user sending or transmitting the business service context or a portion thereof to another user or group of users. In various embodiments, this UI element 1056 may execute an email or other messaging program to which the business service context (or portion thereof) is automatically attached or entered into. In another embodiment, the UI element 1056 may cause another UI to be shown that allows a user to select one or more users or devices to transmit the message to. In various embodiments, the message may include a group update message, as described above. It is understood that the above are merely a few illustrative examples to which the disclosed subject matter is not limited.

Figure 10F:
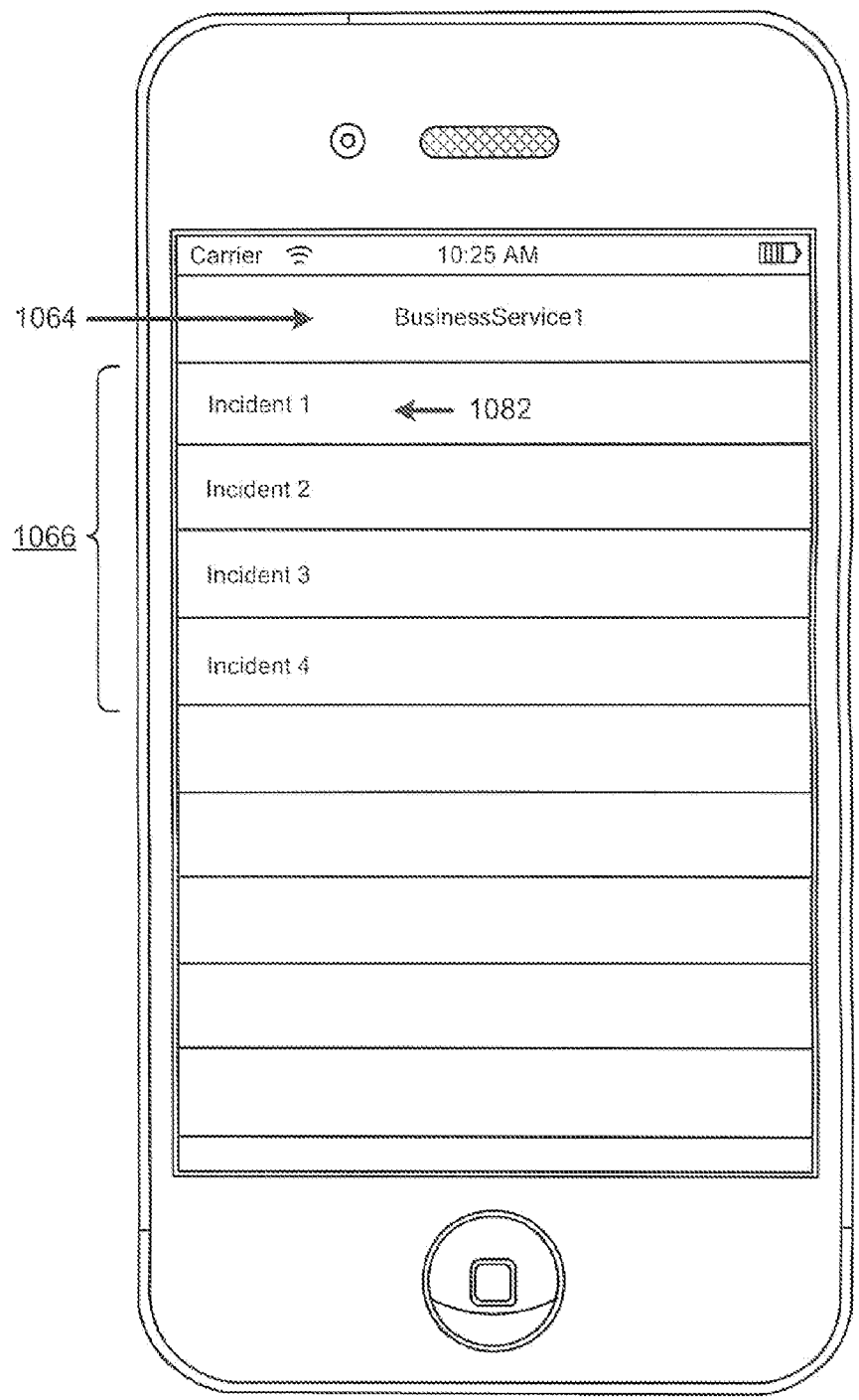
FIG. 10f is a diagram of an example embodiment of a user interface in accordance with the disclosed subject matter.

As described above, in one embodiment, a user may be able to move or switch from the UI 1095 of FIG. 10*e* to the UI 1096 of FIG. 10*f* via the UI element 1058 of FIG. 10*e*. It is understood that the above are merely a few illustrative examples to which the disclosed subject matter is not limited.

FIG. 10*f* is a diagram of an example embodiment of a user interface (UI) 1096 in accordance with the disclosed subject matter. In one embodiment, the UI 1096 may display a detailed view of business service context within or on a mobile computing device. In some embodiments, this UI 1096 may be referred to as the Service Context List View. In such an embodiment, further UI elements may also be displayed In the illustrated embodiment, the UI 1096 may display via UI element 1064 (e.g., a tile bar or header, etc.) which business service the business service context is associated with (e.g., "BusinessService1", etc.). Further the UI 1095 may include an element 1066 to display the service context or a portion thereof.

In various embodiments, various UI elements 1062 may be configured to cause the mobile device to display other portions of the service context or retrieve and display other service contexts. These UI elements 1062 may effectively cause the mobile device to display the sub-views, as described above, and may result in the displaying various embodiments, such as, a detail view configured to display additional inform regarding the service in an alternate format. In various embodiments, various UI elements or views may focus on various aspects of the selected business service. It is understood that the above are merely a few illustrative examples to which the disclosed subject matter is not limited. In another embodiment, the UI elements 1062 may include business service linking UI elements 1062 that cause the retrieval and display other service contexts, as described above.

As described above, in various embodiments, the UI elements 1062 may cause the mobile device to display another UI that provides or displays further detail regarding the business context information. In some embodiments, the information included in the business context may be hierarchical in nature. In one such embodiment, the UI element 1062 may cause an UI such as UI 1097 of FIG. 10*g* to be displayed.

Figure 10G:
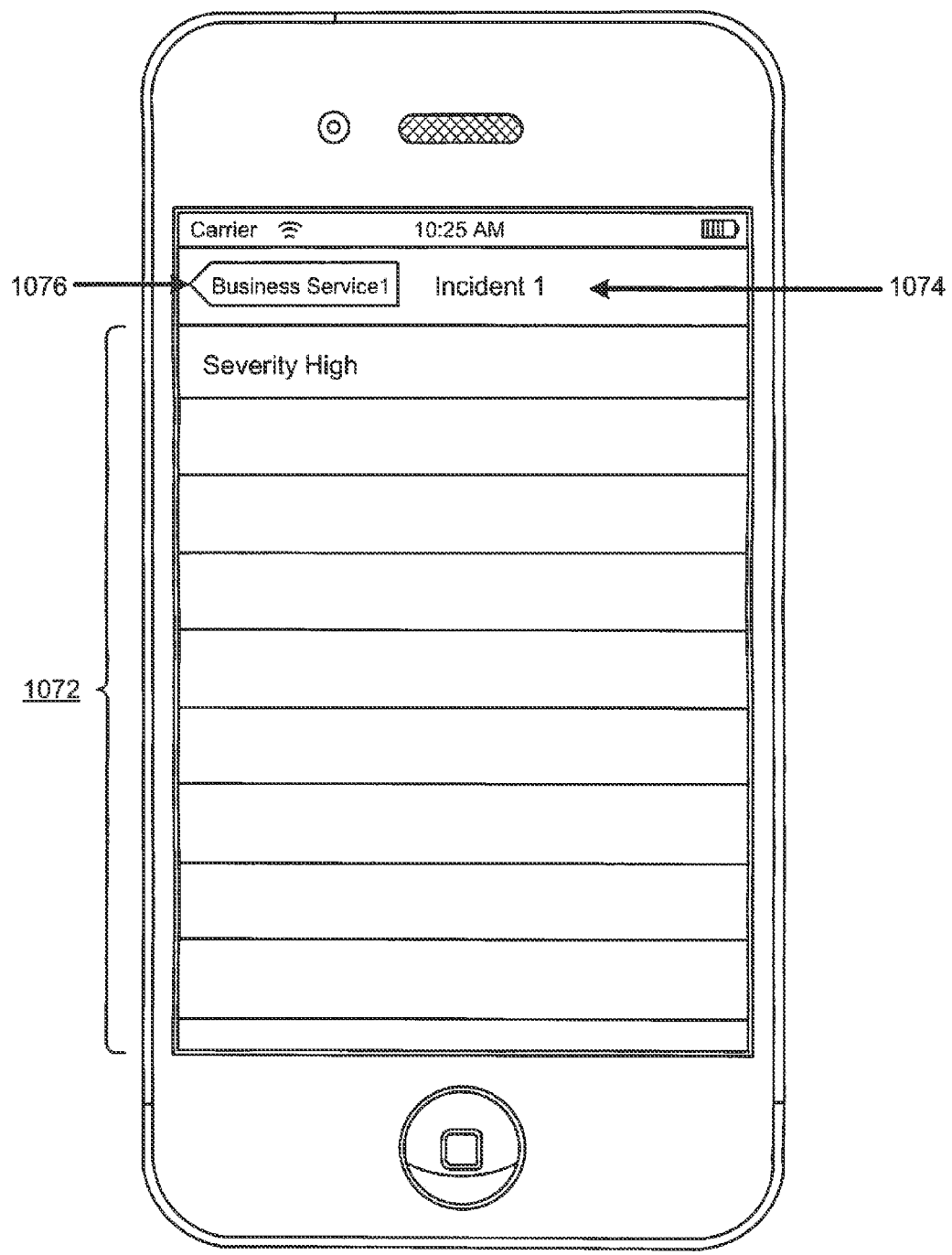
FIG. 10g is a diagram of an example embodiment of a user interface in accordance with the disclosed subject matter.

FIG. 10*g* is a diagram of an example embodiment of a user interface (UI) 1097 in accordance with the disclosed subject matter. In such an embodiment, the UI 1097 may provide a user with a very detailed view of a portion of the information included by business service context (e.g., the "Incident1" portion of the "BusinessService1" context, etc.). It is understood that the above is merely one illustrative example to which the disclosed subject matter is not limited.

In such an embodiment, the UI 1097 may include one or more UI elements 1072 to display detailed information regarding the service context or a portion thereof, displayed by UI 1076. The UI element 1064 may be configured to display current portion of the business service context (now "Incident1") being displayed. In addition, in various embodiments, the UI 1097 may include a UI element 1076 that allows or facilitates the return or retrieval of the prior portion of hierarchical level of the business service context (e.g., "BusinessService1"). In such an embodiment, the user may navigate between multiple portions of the business service context. In the illustrated embodiment, the navigation may be simply "up or down", but in other embodiments lateral or sideways or even more complex navigation between interrelated business service context portions may be possible.

Returning to FIG. 9, Block 914 illustrates that, in one embodiment, that the mobile device may display a GUI on the mobile device that shows a list of additional business service contexts that are associated with the current business service context. As described above, in some embodiments, this GUI may be included as a GUI similar to UIs 1095 of FIG. 10*e*, 1096 of FIG. 10*f* or 1097 of FIG. 10*g*; however, it is understood that the above are merely a few illustrative examples to which the disclosed subject matter is not limited. In various embodiments, one or more of the action(s) illustrated by this Block may be performed by the apparatuses or systems of FIG. 1, 3, or 8, the application of FIG. 1, 3, or 8, as described above.

As described above, in various embodiments, notifications or messages may be pushed or sent to a user or a mobile device. In such an embodiment, the receipt of such a message may be indicated to the user. In various embodiments, this may be done via the operating system of the mobile device.

Figure 10H:
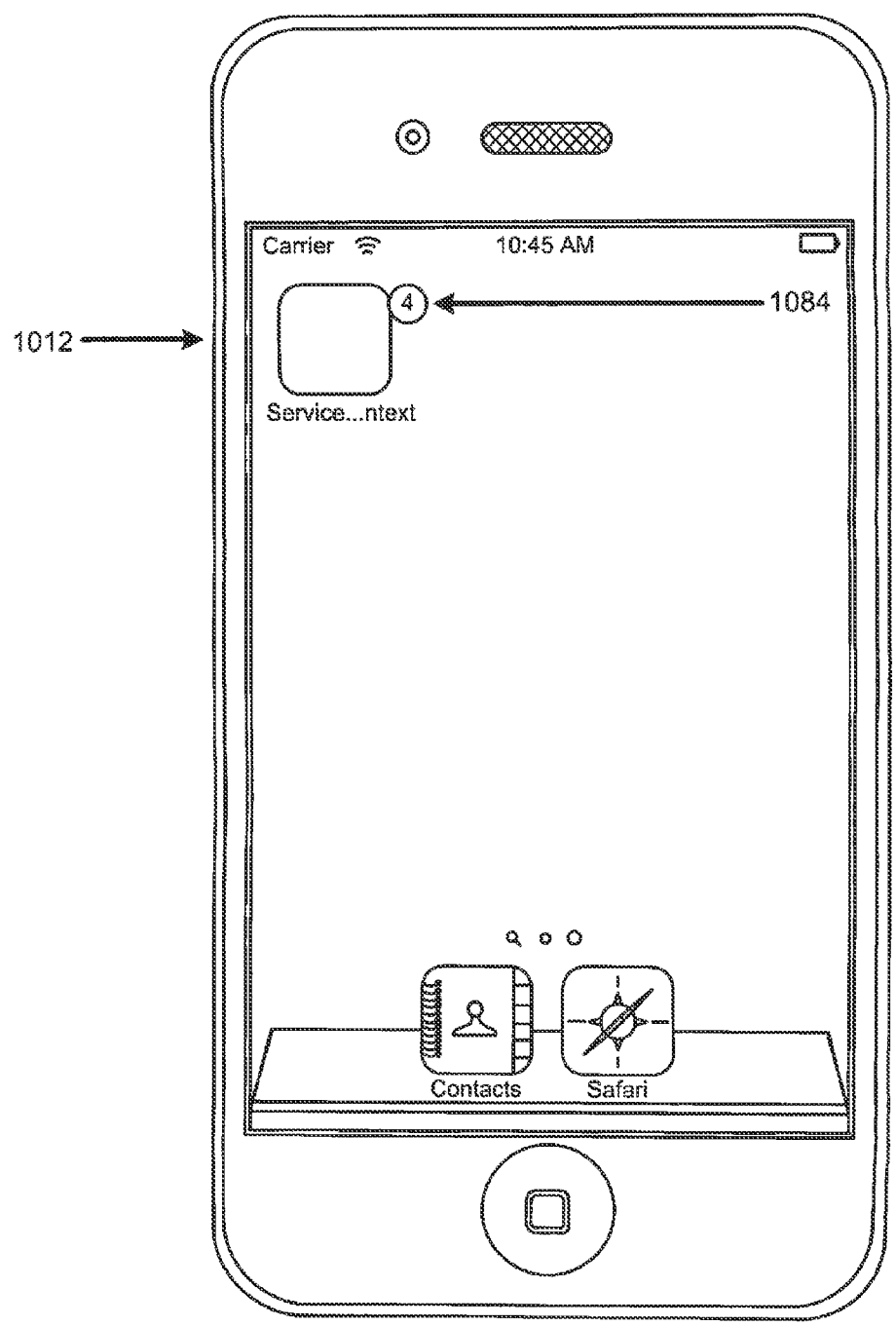
FIG. 10h is a diagram of an example embodiment of a user interface in accordance with the disclosed subject matter.

FIG. 10*h* is a diagram of an example embodiment of a user interface (UI) 1098 in accordance with the disclosed subject matter. In such an embodiment, the UI 1084 may provide a user with an indication of any new messages or notifications that have been pushed or transmitted to the mobile device, as described above. It is understood that the above is merely one illustrative example to which the disclosed subject matter is not limited.

In one embodiment, the business service context application may include or be associated with an icon or UI element 1012. In various embodiments, the UI element 1012 may cause the application to be launched (or executed by the mobile device) or brought to the foreground of the mobile device's UI (in embodiments that include a multi-tasking operating system). It is understood that the above is merely one illustrative example to which the disclosed subject matter is not limited.

In various embodiments, when the mobile device receives a notification or update message from a remote computing device, the application or operating system of the mobile device may cause a UI element 1084 to be shown or available to the user. In such an embodiment, the UI element 1084 may indicate that an update message or notification has been received. In the illustrated embodiment, the UI element 1084 may include a graphic (e.g., a number indicating the number of messages received, etc.) included with or overlaid upon the UI element or icon 1012. In another embodiment, another form or UI element 1084 may be employed (e.g., pop-up window, transient panel, sound, etc.).

In some embodiments, once the user selects or actives the application (e.g., by selecting the UI element 1012, etc.), when the application is associated with one or more notifications, a UI may be presented or displayed to the user that shows the pending or current notifications. In one embodiment, if there is only a single pending or unread notification, a UI may be displayed that immediately shows the user the pending notification. In one embodiment, in which the notification includes a text (or other) message, the UI may display the message. In another embodiment, in which the notification includes a business service context, the UI may display the business service context. It is understood that the above are merely a few illustrative examples to which the disclosed subject matter is not limited.

FIG. 11 is a flow chart of an example embodiment of a technique 1100 in accordance with the disclosed subject matter. In various embodiments, the technique 1100 may be used or produced by the systems such as those of FIG. 1, 3, 5*a*, or 8. Although, it is understood that the above are merely a few illustrative examples to which the disclosed subject matter is not limited. It is understood that the disclosed subject matter is not limited to the ordering of or number of actions illustrated by technique 1100.

Block 1102 illustrates that, in one embodiment, at least a portion of a business service context regarding a business service may be requested by a mobile device, as described above. In various embodiments, requesting may include retrieving and/or displaying a list of business services, as described above. In such an embodiment, the user may select one of these business services. In response to the selection the mobile device may then request the respective business service context, as described above. In various embodiments, the user may manually add a business service to the list, as described above. In another embodiment, the user may manually edit the list of business services, as described above. In various embodiments, one or more of the action(s) illustrated by this Block may be performed by the apparatuses or systems of FIG. 1, 3, 5*a*, or 8, or the mobile computing device or the network interface of FIG. 8, as described above.

Block 1104 illustrates that, in one embodiment, an aggregated database result regarding the business service may be received from a database, as described above. In various embodiments, the aggregated database result may include the requested business service context, as described above. In some embodiments, the business service context may include information from a plurality of applications, as described above. In one embodiment, receiving may include receiving the aggregated database result as part of a single database query transaction, as described above. In such an embodiment, the aggregated database result may be provided by an at least partially virtual database that virtualizes database fields whose field values are provided by the plurality of other applications, as described above. In various embodiments, one or more of the action(s) illustrated by this Block may be performed by the apparatuses or systems of FIG. 1, 3, 5*a*, or 8, or the mobile computing device or the network interface of FIG. 8, as described above.

Block 1106 illustrates that, in one embodiment, a graphical user interface element may be displayed that displays at least a portion of the information included by the business service context, as described above. In various embodiments, displaying may include displaying a first portion of the information included by the business service context, as described above. In another embodiment, displaying may include displaying a business service linking user interface element that when selected causes a second business service context to be created and displayed, wherein the second business service context is associated with a second business service indicated by the business service linking user interface element, as described above. In various embodiments, one or more of the action(s) illustrated by this Block may be performed by the apparatuses or systems of FIG. 1, 3, 5*a*, or 8, or the mobile computing device or the monitor of FIG. 8, or the user interfaces of FIGS. 10*a*-10*h*, as described above.

Block 1108 illustrates that, in one embodiment, in response to a user indicating that the user wishes to view more information regarding at least one aspect of the business service context, displaying a second portion of information included by the business service context, as described above. In various embodiments, one or more of the action(s) illustrated by this Block may be performed by the apparatuses or systems of FIG. 1, 3, 5*a*, or 8, or the mobile computing device or the monitor of FIG. 8, or the user interfaces of FIGS. 10*a*-10*h*, as described above.

Block 1122 illustrates that, in one embodiment, a message may be transmitted to a remote computing device that causes a user of the mobile computing device to be associated with a business service, as described above. In various embodiments, the message may instead cause the user to be associated with a group of users, as described above. In another embodiment, transmitting may include transmitting a message to the remote computing device that causes the user to be associated with a group of users, wherein the group of users is associated with at least one business service, as described above. In various embodiments, one or more of the action(s) illustrated by this Block may be performed by the apparatuses or systems of FIG. 1, 3, 5*a*, or 8, or the mobile computing device or the network interface of FIG. 8, as described above.

Block 1124 illustrates that, in one embodiment, a notification from the remote computing device may be received when or in response to at least one predefined event regarding the associated business service has occurred, as described above. In various embodiments, receiving may include receiving, from a database, an aggregated database result regarding the business service, wherein the aggregated database result includes a second business service context, as described above. In various embodiments, one or more of the action(s) illustrated by this Block may be performed by the apparatuses or systems of FIG. 1, 3, 5*a*, or 8, or the mobile computing device or the network interface of FIG. 8, as described above.

Block 1142 illustrates that, in one embodiment, at a user's request, at least a portion of the information included by the business service context may be transmitted from the mobile computing device to a second computing device, as described above. In various embodiments, the second computing device may include a mobile computing device, as described above. In some embodiments, transmitting may include instructing a remote computing device to provide the portion of the information included by the business service context to a second user, as described above. In some embodiments, the second user may be associated with the second computing device, as described above. In various embodiments, one or more of the action(s) illustrated by this Block may be performed by the apparatuses or systems of FIG. 1, 3, 5*a*, or 8, or the mobile computing device or the network interface of FIG. 8, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a capacitive touchscreen, a restive touchscreen, or a liquid crystal display (LCD) monitor, for displaying information to the user and a keyboard and/or a pointing device (e.g., a mouse, a trackball, a touchscreen, etc.), by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a wired or wireless local area network (LAN), a wide area network (WAN), e.g., the Internet, or a cellular network.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for providing a service status, the method being performed by at least one processor, the method comprising:
   displaying, by a computing device executing an application, a user interface associated with the application, the user interface providing a selection of a service that is implemented within an Information Technology (IT) environment having computing devices and software applications executing on the computing devices, the service being a software application or a computing device operating within the IT environment;
   requesting, by the computing device, a service status about the service based on the selection;
   receiving, by the computing device, a single transaction having aggregated performance data regarding the service from a configuration management database CMDB) storing configuration items (CIs), the CMDB including a database that is at least partially virtualized, the CMDB configured to receive a transaction request from the computing device and provide the single transaction as if the database was a non-virtualized database, the aggregated performance data including a first attribute collected by the CMDB from a first business server and a second attribute collected by the CMDB from a second business server, the first business server and the second business server being different database servers, the first attribute being aggregated with the second attribute, the aggregated performance data identifying one or more performance problems of the software application or the computing device within a context of the IT environment, wherein the CMDB defines a service context abstraction layer that represents virtual fields for the first and second attributes; and
   displaying, by the computing device, the service status as a user interface element viewable within the user interface of the application, the service status providing a display of the aggregated performance data that has been received from the CMDB.

2. The method of claim 1, wherein the service status includes an arrangement of fields providing information about the software application or the computing device, the information about the software application or the computing device including the aggregated performance data, at least one of the fields displaying a number of incidents associated with the software application or the computing device, the application being either a first application associated with a first user interface or a second application associated with a second user interface, the second user interface being different than the first user interface, wherein the arrangement of the fields within the service status is displayed in a same manner when display in context of the first user interface or the second user interface.

3. The method of claim 1, wherein the displayed user interface element of the service status is integrated within the user interface associated with the application.

4. The method of claim 1, wherein the service status provides information that is not provided by the application alone.

5. The method of claim 1, further comprising:
   displaying, by a secondary computing device executing a secondary application, a user interface associated with the secondary application, the user interface of the secondary application providing a selection of the service;
   requesting, by the secondary computing device, a service status for the service based on the selection; and
   displaying, by the secondary computing device, the service status as a user interface element viewable within the user interface of the secondary application, the service status displayed by the secondary computing device being equivalent to the service status displayed by the computing device.

6. The method of claim 1, further comprising:
   receiving, by the computing device, a request to display more detailed information regarding the service based on an interaction with the user interface element of the service status; and
   displaying, by the computing device, the more detailed information within the user interface element of the service status or a separate user interface element.

7. The method of claim 1, wherein the aggregated performance data includes calculated performance metrics associated with one or more configuration items of the computing device.

8. The method of claim 1, wherein the computing device is a mobile computing device.

9. A computing device comprising:
   at least one processor;
   a non-transitory computer-readable medium storing instructions that when executed by the at least one processor are configured to implement:

a host application configured to provide a user interface, the user interface providing a selection of a service that is implemented within an Information Technology (IT) environment having computing devices and software applications executing on the computing devices, the service being a software application or a computing device operating within the IT environment that is different than the host application; and a network interface unit configured to request a service status for the service based on the selection, the network interface unit configured to receive a single transaction having aggregated performance data regarding the service from a configuration management database (CMDB) storing configuration items (CIs), the CMDB including a database that is at least partially virtualized, the CMDB configured to receive a transaction request from the computing device and provide the single transaction as if the database was a non-virtualized database, the aggregated performance data including a first attribute collected by the CMDB from a first business server and a second attribute collected by the CMDB from a second business server, the first business server and the second business server being different database servers, the first attribute being aggregated with the second attribute, the aggregated performance data identifying one or more performance problems of the software application or the computing device within a context of the IT environment, wherein the CMDB defines a service context abstraction layer that represents virtual fields for the first and second attributes, wherein the service status is displayed as a user interface element viewable within the user interface of the host application, the service status providing a display of the aggregated performance data that has been received within the single database transaction.

10. The computing device of claim 9, wherein the service status includes an arrangement of fields providing information about the software application or the computing device, the information about the software application or the computing device including the aggregated performance data, at least one of the fields displaying a number of incidents associated with the software application or the computing device, the host application being a first application associated with a first user interface or a second application associated with a second user interface, the second user interface being different than the first user interface, wherein the arrangement of the fields within the service status is displayed in a same manner when display in context of the first user interface or the second user interface.

11. The computing device of claim 9, wherein the displayed user interface element of the service status is integrated within the user interface associated with the host application.

12. The computing device of claim 9, wherein the service status provides information that is not provided by the host application alone.

13. The computing device of claim 9, wherein the user interface element of the service status receives a request to display more detailed information regarding the software application or the computing device, wherein the more detailed information is displayed within the user interface element of the service status or a separate user interface element.

14. The computing device of claim 9, wherein the aggregated performance data includes calculated performance metrics associated with one or more configuration items of the software application or the computing device.

15. The computing device of claim 9, wherein the computing device is a mobile computing device.

16. A computer program product being tangibly and non-transitorily embodied on a non-transitory computer-readable medium and including executable code that, when executed, is configured to cause a mobile computing device to:

display a list of services on a mobile computing device;

receive a selection of a service from the list of services, the service being a software application or a computing device implemented within an Information Technology (IT) environment having computing devices and software applications executing on the computing devices;

transmit a service status for the selected service to a configuration management database (CMDB) storing configuration items (CIs);

receive a single transaction having aggregated performance data regarding the service from the CMDB, the CMDB including a database that is at least partially virtualized, the CMDB configured to receive a transaction request from the computing device and provide the single transaction as if the database was a non-virtualized database, the aggregated performance data including a first attribute collected by the CMDB from a first business server and a second attribute collected by the CMDB from a second business server, the first business server and the second business server being different database servers, the first attribute being aggregated with the second attribute, the aggregated performance data identifying one or more performance problems of the software application or the computing device within a context of the IT environment, wherein the CMDB defines a service context abstraction layer that represents virtual fields for the first and second attributes; and display the service status as a user interface element on the mobile computing device, the service status providing a display of the aggregated performance data that has been received.

17. The computer program product of claim 16, further comprising:

display a secondary user interface element on the mobile device that displays a list of additional service statuses that are associated with the selected service.

18. The computer program product of claim 16, further comprising:

receive a request to display more detailed information regarding the service based on an interaction with the user interface element of the service status; and display the more detailed information within the user interface element of the service status or a separate user interface element.

19. The computer program product of claim 16, wherein the aggregated performance data includes calculated performance metrics associated with one or more configuration items of the software application or the computing device.

20. The computer program product of claim 16, wherein the aggregated performance data indicates a number of incidents associated with the selected service, and upon selection of an incident, provides a level of severity associated with the incident.

* * * * *